(12) United States Patent
Khairallah

(10) Patent No.: US 6,686,717 B2
(45) Date of Patent: Feb. 3, 2004

(54) MODULAR ARTICULATED STRUCTURE

(76) Inventor: Charles Khairallah, 1650 Lincoln Street Apartment 1203, Montreal Quebec (CA), H3H 1H1

( * ) Notice: Subject to any disclaimer, the term of this patent is extended or adjusted under 35 U.S.C. 154(b) by 123 days.

(21) Appl. No.: 09/985,483

(22) Filed: Nov. 5, 2001

(65) Prior Publication Data

US 2002/0053893 A1 May 9, 2002

Related U.S. Application Data

(63) Continuation-in-part of application No. 09/408,939, filed on Sep. 30, 1999, now Pat. No. 6,323,615, which is a continuation of application No. PCT/CA98/00293, filed on Apr. 1, 1998.

(30) Foreign Application Priority Data

Apr. 1, 1997 (GB) .............................. 9706625
Apr. 23, 2001 (CA) .............................. 2344837

(51) Int. Cl.[7] .................................. B25J 9/18
(52) U.S. Cl. ............................ 318/568.11; 318/568.12; 901/1; 901/28
(58) Field of Search ................ 318/568.1, 568.11, 318/568.12, 568.21; 901/1, 2, 9, 14, 15, 19, 23, 25, 27, 28, 29, 30, 46, 48

(56) References Cited

U.S. PATENT DOCUMENTS

| | | | |
|---|---|---|---|
| 3,543,910 A | * | 12/1970 | Devol et al. |
| 3,580,099 A | * | 5/1971 | Mosher |
| 3,712,481 A | | 1/1973 | Harwood |
| 4,561,816 A | | 12/1985 | Dingess |
| 4,662,814 A | * | 5/1987 | Suzuki et al. |
| 4,685,349 A | | 8/1987 | Wada et al. |
| 4,724,716 A | | 2/1988 | Kawai |
| 4,766,775 A | | 8/1988 | Hodge |
| 4,914,975 A | | 4/1990 | Bailey et al. |
| 4,949,586 A | | 8/1990 | Akagawa |
| 4,993,913 A | * | 2/1991 | Ohtsuki |
| 5,130,632 A | | 7/1992 | Ezawa et al. |
| 5,523,662 A | | 6/1996 | Goldenberg et al. |
| 5,611,147 A | | 3/1997 | Raab |
| 5,739,655 A | * | 4/1998 | Torii et al. ............ 318/568.12 |
| 5,800,567 A | * | 9/1998 | Cooper et al. |

FOREIGN PATENT DOCUMENTS

| | | |
|---|---|---|
| CH | 637 870 | 8/1983 |
| DE | 2 754 609 | 4/1979 |
| DE | 195 17 852 | 12/1995 |
| EP | 0 108 657 | 5/1984 |
| EP | 0 658 402 | 6/1995 |
| FR | 2 593 426 | 7/1987 |

* cited by examiner

Primary Examiner—Bentsu Ro
(74) Attorney, Agent, or Firm—Ogilvy Renault; Robert Mitchell

(57) ABSTRACT

A modular articulated robot structure (FIG. 4) composed of a series of independent modules (10,100,300) releasably connected to each other to form various configurations. The modules (10,100,300) may be of the rotary (10), linear (100), or wheeled (300) type. The rotary modules (10) are generally formed of first and second substantially U-shaped structural members (12,14) pivotally attached to one another by means of a pair of axles or pivot pins (26) adapted to support a workload exerted on the module (10). An actuator (48) is mounted internally of the module (10) for pivoting the second structural member (14) relative to the first structural member (12). The actuator (48) is connected to the second structural member (14) in such a way that it is not submitted to outside loads exerted on the module (10). Typically, the first and second structural members (12,14) are provided with cooperating abutment surfaces (17,19,74, 76,78,80) for increasing the overall structural rigidity of the module (10) in certain positions thereof.

18 Claims, 18 Drawing Sheets

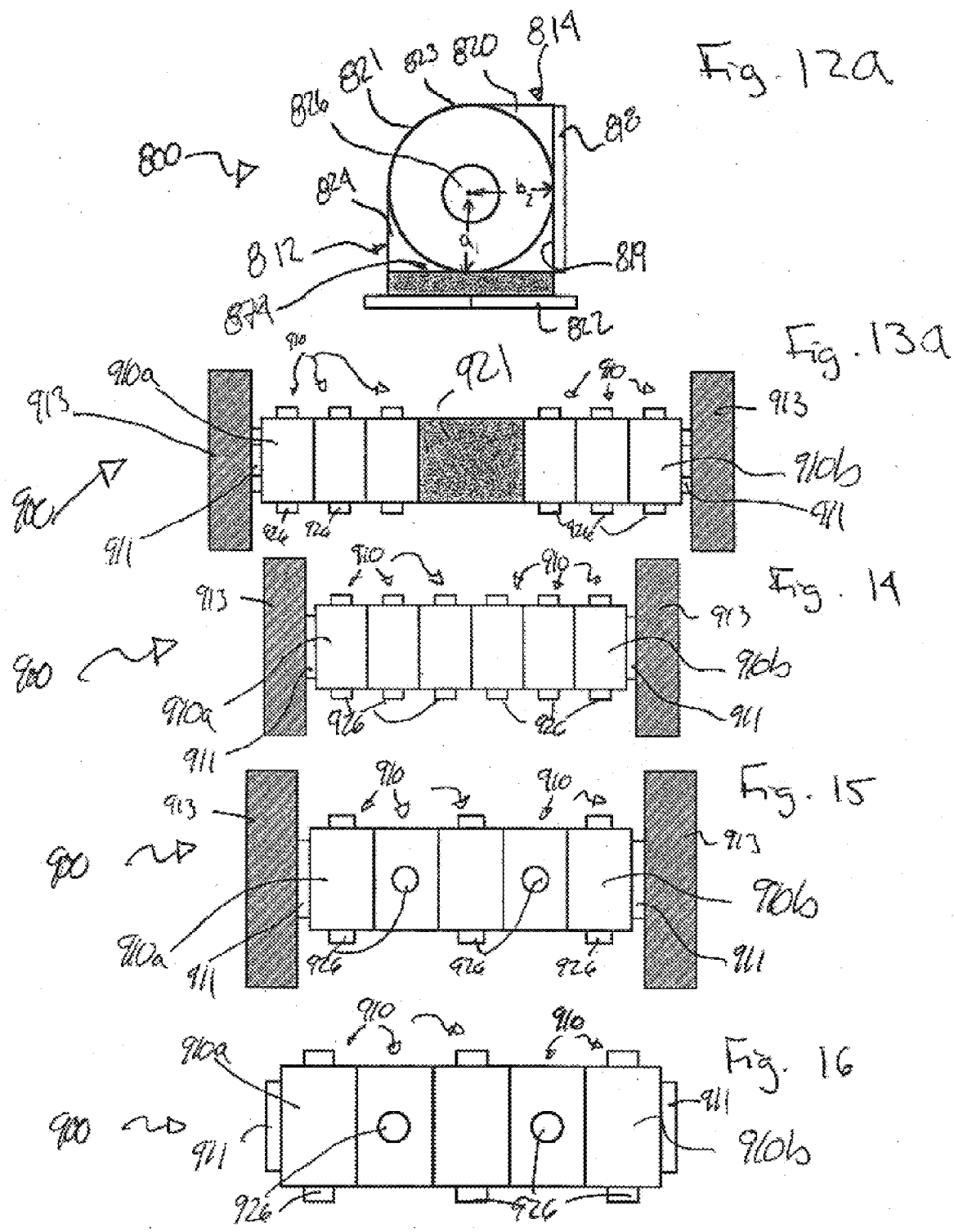

MODULAR ARTICULATED STRUCTURE

RELATED APPLICATIONS

This Application is a Continuation-In-Part of U.S. patent application Ser. No. 09/408,939 filed on Sep. 30, 1999, now U.S. Pat. No. 6,323,615 B1 which is a continuation of International PCT Application No. PCT/CA98/00293 filed on Apr. 1, 1998, which claims the benefit of GB Application No. 9706625.2.

BACKGROUND OF THE INVENTION

1. Field of the Invention

The present invention relates to articulated structures and, more particularly, to a modular articulated structure suited for use as a robot skeleton.

2. Description of the Prior Art

In the prior art it is known to have robot systems that are modular, reconfigurable and expandable to thus improve the flexibility and versatility thereof. For instance, U.S. Pat. No. 5,523,662 issued to Goldenberg et al. on Jun. 4, 1996, discloses a manipulator arm formed of a number of independent rotary joints releasably connected to each other by means of elongated connector members. The manipulator arm may be disassembled and reassembled in order to obtain different arm configurations. More particularly, each joint generally includes a L-shaped member and an inverted U-shaped member pivotally movable with respect to the L-shaped member. A motor having a drive shaft is mounted to the L-shaped member for pivoting the inverted U-shaped member relative to the L-shaped member. The inverted U-shaped member includes a pair of opposed downwardly extending connecting plates that are pivotally connected respectively to an upwardly extending portion of the L-shaped member and to the drive shaft of the motor. Accordingly, the U-shaped member is supported by both the L-shaped member and the drive shaft of the motor, whereby the drive shaft is submitted to workloads and static loads, and thus the overall structural rigidity of the manipulator arm is compromised.

Therefore, it would be advantageous to provide a rotary joint having a motor that is configured and positioned to transmit a pivotal force without supporting any load other than the rotational load.

Furthermore, the aforementioned L-shaped and inverted U-shaped members do not provide support to each other at certain relative positions thereof which would increase the rigidity of the above described flexible manipulator arm in these positions, as this increased rigidity may be required to accomplish particular tasks.

It would also be very suitable to have a modular robot structure wherein each module is provided with mating electrical connectors, such as pin connectors, to enable quick connection and disconnection of adjacent modules.

Finally, it would also be very suitable to have a flexible modular arm structure offering increased flexibility while occupying as little room as possible.

SUMMARY OF THE INVENTION

It is therefore an aim of the present invention to provide a compact rotary module forming part of an articulated structure and having an actuator which is essentially not submitted to loads other than the rotational loads induced by the actuator itself.

It is also an aim of the present invention to provide a robot system having a flexible architecture.

It is also an aim of the present invention to provide a displaceable robot system which is adapted to evade obstacles and which offers increase manoeuvrability.

It is a further aim of the present invention to provide a flexible architecture that is modular, expandable and reconfigurable.

It is a still further aim of the present invention to provide a flexible architecture that is designed to offer ease of assembly and disassembly.

It is a still further aim of the present invention to provide a flexible robot structure, which is adapted to be configured to provide sufficient structural rigidity to perform a particular task.

It is a still further aim of the present invention to provide a robot system, which provides a relatively lightweight structure.

It is a still further aim of the present invention to provide a robot system, which is relatively simple and economical to manufacture.

Therefore, in accordance with the present invention, there is provided a module for forming a segment of an articulated robot structure, comprising first and second structural members, an axle for pivotally mounting said second structural member to said first structural member, an actuator for pivoting said second structural member relative to said first structural member, a sensor for sensing a position of said second structural member, and a control unit connected to said sensor for controlling movements of said second structural member, wherein said first and second structural members each include a base plate and a pair of spaced-apart side plates extending from said base plate, said base plates of said first and second structural members each including attachment means for releasably attaching said module to respective adjacent modules, and wherein said module is provided with a communication interface for allowing said module to communicate with adjacent modules, said communication interface being connected to said control unit for allowing control commands to be fed through a given number of assembled modules.

Also in accordance with the present invention, there is provided a flexible snake robot comprising a number of serially interconnected rotary modules, each rotary module including first and second structural members pivotally connected together, an actuator for pivoting said second structural member relative to said first structural member, a sensor for sensing an angular position of said second structural member relative to said first structural member, a controller operatively connected to said sensor for operating said actuator, wherein said flexible snake robot has first and second opposed free ends, said first and second opposed free ends being interconnectable, and wherein said flexible snake robot is configurable into a loop with said first and second free ends thereof releasably interconnected to form an endless chain of modules.

Further in accordance with the present invention, there is provided a module for forming a segment of an articulated structure, comprising first and second structural members pivotally mounted together, said first and second structural members having cooperating abutting surfaces radially arranged relative to an axis of rotation of said module so as to continuously remain tangential to one another while said second member is pivoted relative to said first structural member, thereby providing continuous radial bearing contact between said first and second structural members such that a load on said module is supported substantially entirely by said bearing surfaces of said first and second structural members.

Still further in accordance with the present invention, there is provided a walking robot structure comprising a series of rotary modules assembled in line and having a first terminal module at a first end thereof and a second terminal module at a second opposed end thereof, each rotary module having first and second structural members pivotally connected to one another for rotation about a pivot axis and being operated by an actuator, said first and second terminal modules each having an axle extending generally in parallel to a longitudinal axis of said series, and a riding disc mounted on each of said axles laterally outwardly of said series, said riding disc having a circumferential surface adapted to ride on a support surface when said rotary modules are displaced in a rigid axle configuration and a lateral outer surface adapted to serve as a base surface for allowing said walking robot structure to walk on said lateral outer surfaces of said riding discs when said rotary modules are rotated relative to one another.

Still further in accordance with the present invention, there is provided a movable robot structure comprising a pair of riding discs mounted on respective secondary axles extending axially outwardly from opposed ends of an articulated main axle, said articulated main axle including a number of serially connected rotary modules having respective pivot axes extending perpendicularly to said secondary axles, and wherein each of said rotary modules is operated by an actuator controlled by a control unit.

Still further in accordance with the present invention, there is provided a flexible elongated structure comprising a series of rotary modules detachably assembled in a chain-like configuration, each rotary module including a hollow joint having an internal free space for housing at least one component, said hollow joint including first and second structural members, each of said first and second structural members being provided with a pair of spaced-apart side plates extending from a base plate, said side plates of said second structural member being received between said side plates of said first structural member and pivotally connected thereto so that said second structural member is pivotable relative to said first structural member about an axis perpendicular to said side plates, and rigid connections for releasably attaching adjacent pairs of rotary modules.

Still further in accordance with the present invention, there is provided an article handling/supporting structure comprising a vertical mounting column, a cantilever flexible arm having a first end connected to said vertical column and a second opposed end adapted to carry an article, said cantilever flexible arm being vertically displaceable between fixed positions along said vertical column and including a number of serially interconnected rotary modules, each rotary module including first and second structural members, a vertical axle pivotally connecting said first and second structural members together so that adjacent modules are rotatable with respect to each other in a horizontal plane while being prevented from rotational movement in a vertical plane under gravitational forces, thereby providing for a self-supported flexible arm.

Still further in accordance with the present invention, there is provided a flexible arm for use in a three dimensional coordinate measuring device, said flexible arm being supported at a first end thereof and carrying a probe at a second opposed end thereof, said flexible arm comprising:

a series of rotary modules assembled together in a chain-like configuration so that said series is movable within a given volume, each of said rotary modules including a hollow joint defined by first and second structural members pivotally mounted together in opposed facing relationship for pivotal movement about an axis perpendicular to a longitudinal axis of said series of rotary modules, and a sensor for providing rotational positioning data on each of said rotary modules, and a rigid connection between each pair of adjacent rotary modules to releasably attach the second structural member of a first rotary module to the first structural member of a second rotary module.

Still further in accordance with the present invention, there is provided a flexible robot limb comprising a number of serially interconnected rotary modules, each rotary module including first and second structural members pivotally connected together, an actuator for pivoting said second structural member relative to said first structural member, a sensor for sensing an angular position of said second structural member relative to said first structural member, a controller operatively connected to said sensor for operating said actuator, and wherein a number of said rotary modules further includes a break selectively acting on said second structural members thereof to releasably lock a segment of said flexible robot limb in a rigid state while allowing other segments of said robot limb to remain flexible.

BRIEF DESCRIPTION OF THE DRAWINGS

Having thus generally described the nature of the present invention, reference will now be made to the accompanying drawings, showing by way of illustration a preferred embodiment thereof, and in which:

FIG. 12a is a schematic side elevation view of a rotary module having continuous bearing surfaces in accordance with a further embodiment of the present invention;

FIGS. 13a, 13b and 14 to 19 are schematic views of a modular articulated robot structure suited to act as a walking robot in accordance with a further aspect of the present invention;

DESCRIPTION OF THE PREFERRED EMBODIMENTS

Figure 1:
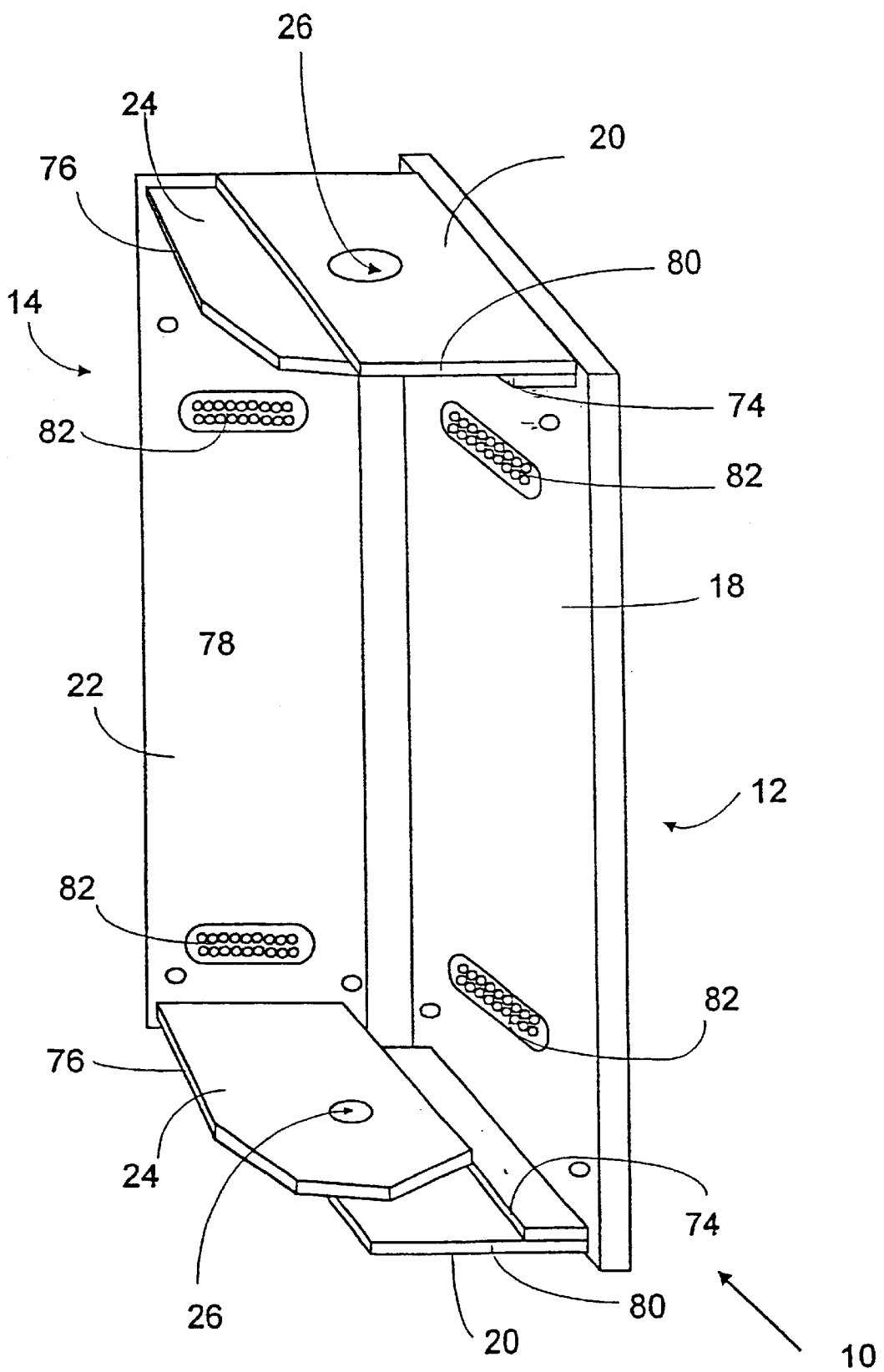
FIG. 1 is a simplified perspective view of a pair of structural members of a rotary module of an articulated robot structure according to the present invention.

Now referring to the drawings, a modular, expandable and reconfigurable articulated robot system in accordance with the present invention will be described.

As will be explained in more details hereinafter, the modular articulated robot system is formed of a series of similar or different independent modules that may be configured so as to perform a particular task.

Figure 2:
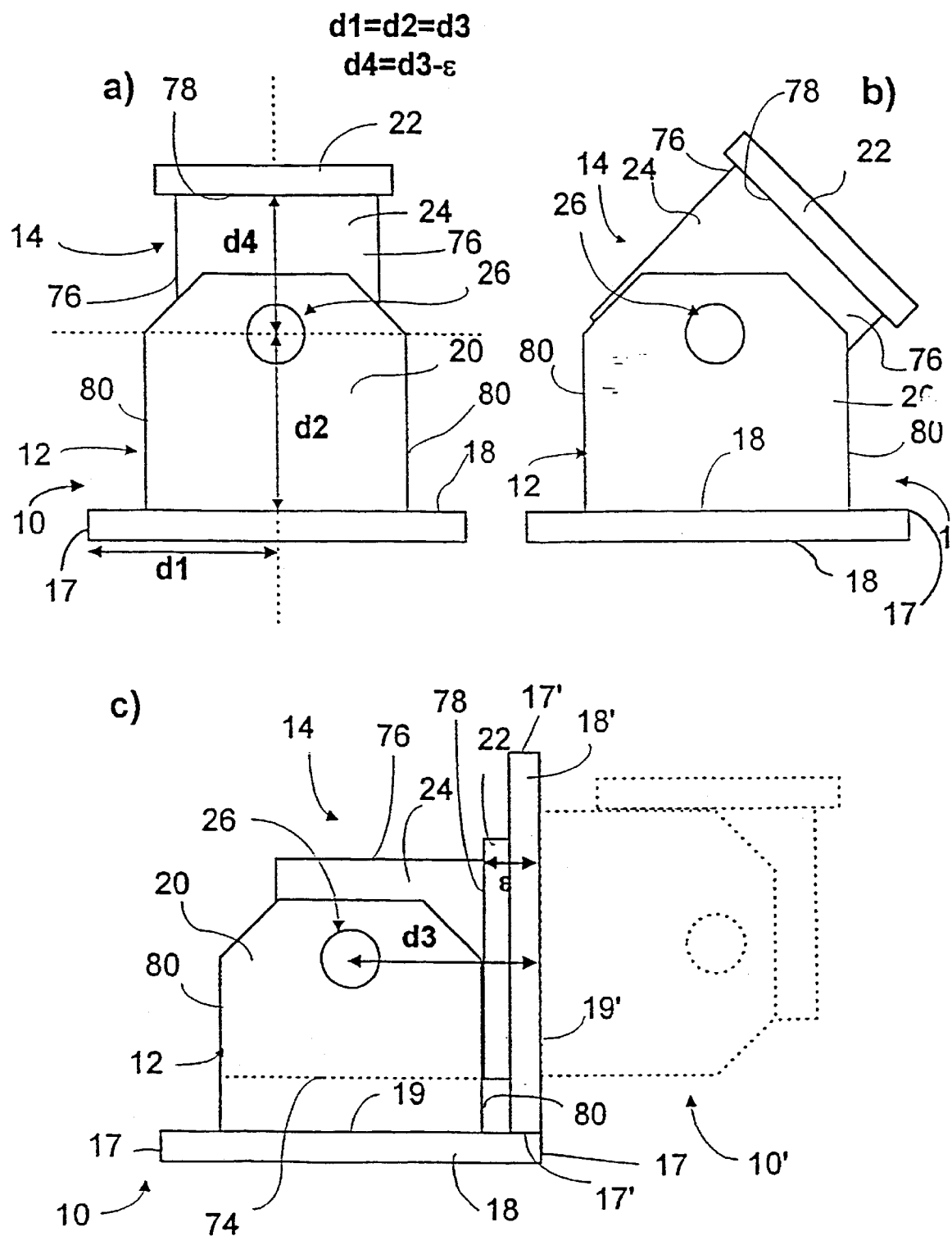
FIGS. 2a to 2c are simplified side elevation views of the rotary module of FIG. 1 shown in different positions, with FIG. 2c illustrating in phantom lines an additional rotary module mounted to the rotary module of FIGS. 2a and 2c.
Figure 3:
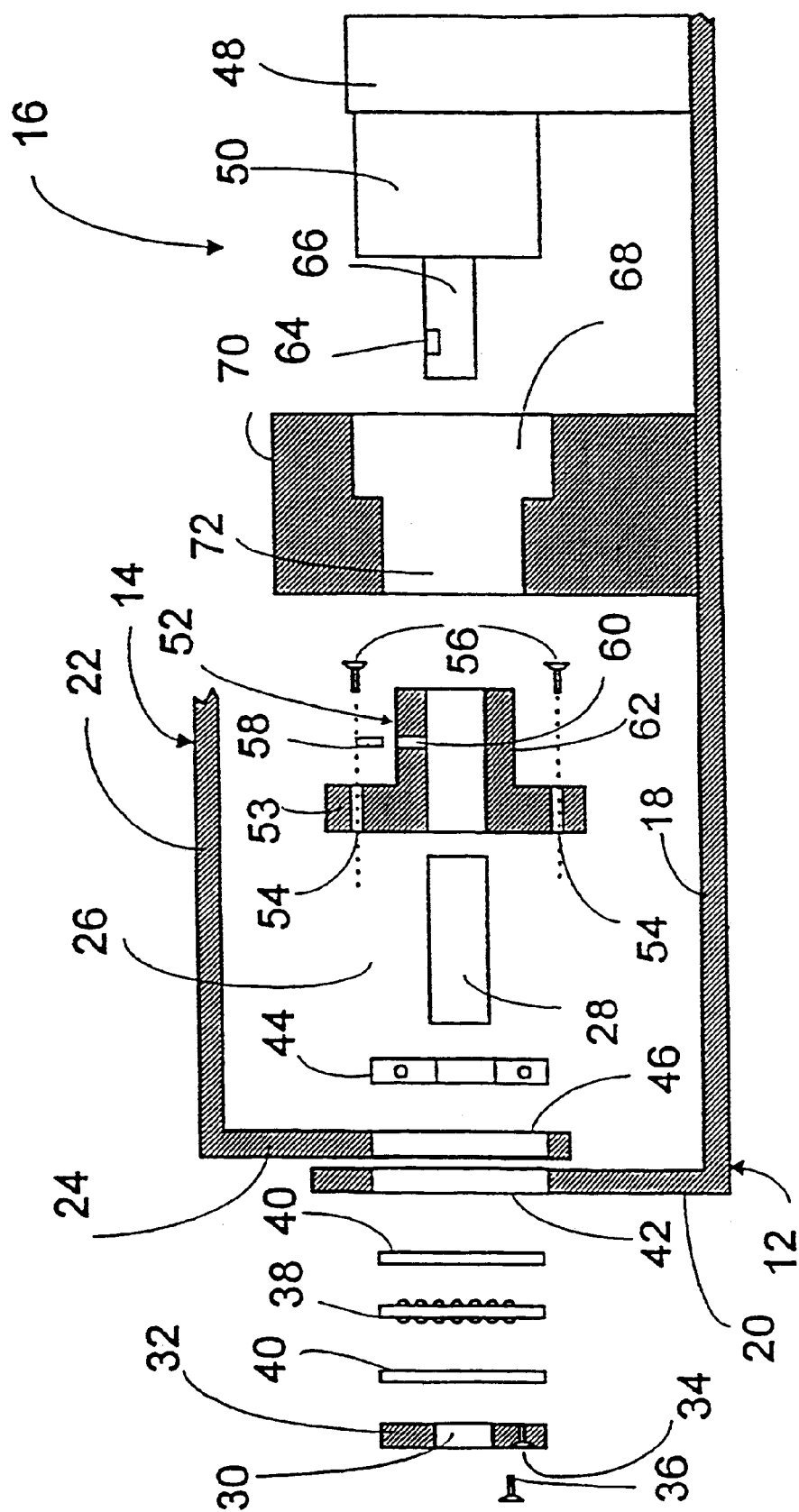
FIG. 3 is an exploded view of a left portion of the rotary module of FIG. 1 showing how the structural members of the module are pivotally attached to each other.

In accordance with the present invention, FIGS. 1 to 3 illustrate a rotary module 10 of an articulated robot structure. Basically, the rotary module 10 comprises a pair of pivotally connected structural members 12 and 14, and a motor and transmission assembly 16 positioned and configured to impart a rotational movement to the structural member 14 with respect to the structural member 12.

More specifically, the structural member 12 has a substantially U-shaped or C-shaped configuration and includes a base plate 18 and a pair of parallel side plates 20 extending at right angles from opposed end portions of the base plate 18. According to a preferred embodiment of the present invention, the base plate 18 and the side plates 20 are integral and made of steel.

Similarly, the structural member 14 has a substantially U-shaped or C-shaped configuration and includes a base plate 22 and a pair of parallel side plates 24 extending at right angles from opposed ends of the base plate 22. The base plate 22 and the side plates 24 are also preferably integral and made of steel.

As seen in FIG. 1, the parallel side plates 24 of the structural member 14 are dimensioned and configured to fit within the space defined between the parallel side plates 20 of the structural member 12. The adjacent side plates 20 and 24 of the structural members 12 and 14 are pivotally attached to one another by means of connecting pivot assemblies 26 disposed on a common axis.

More specifically, as seen in FIG. 3, each connecting pivot assembly 26 essentially comprises a pivot pin 28 pressure fitted in a central bore 30 defined in a disc 32 secured to an outer surface of a side plate 20 of the structural member 12. The disc 32 defines a number of circumferentially spaced-apart holes 34 through which fasteners 36 are inserted for securing the disc 32 to the side plate 20. The pivot pin 28 extends through a lateral bearing 38 disposed between a pair of washers 40 mounted in a hole 42 defined in the side plate 20 of the structural member 12 and through a bearing 44 pressure fitted in a hole 46 defined in the side plate 24 of the structural member 14.

As seen in FIG. 3, the actuator and transmission assembly 16 includes an actuator 48 rigidly secured to the base plate 18 of the structural member 12. The actuator 48 may be of any suitable type such as a conventional DC electric servo-motor. The actuator 48 has a drive shaft coupled to a conventional gear box 50 which is adapted to transfer the rotational force developed by the actuator 48 to a coupling 52 secured to an inner surface of one of the side plates 24 of the structural member 14 to thus cause a pivot of the latter with respect to the structural member 12.

The coupling 52 includes a circular flange portion 53, which defines a plurality of circumferentially spaced-apart apertures 54 through which fasteners 56 are inserted to secure the adapter 52 to the side plate 24. A locking pin 58 or the like is inserted through a radial hole 60 defined in a hollow elongated cylindrical portion 62 of the adapter 52 and in a hole 64 defined in an output shaft 66 coupled to the gear box 50 to lock the adapter 52 to the output shaft 66.

The gear box 50 is disposed in a recess 68 defined in a support member 70 fixedly secured to the base plate 18 of the structural member 12. The support member 70 further defines a cylindrical bore 72 which communicates with the recess 68 and which is adapted to freely accommodate the cylindrical portion 62 of the adapter 52 for rotational movement therein.

According to the above described construction, it is the connecting pivot assemblies 26 which support the outside loads exerted on the rotary module 10 and thus the drive shaft of the actuator 48 may be used substantially solely to impart a relative rotational movement between the structural members 12 and 14. With respect to structural member 12, the structural member 14 and any other load supported thereby are supported by structural member 12 by the pivot assemblies 26 and not by output shaft 66 of the actuator 48. Therefore, it can be said that the output shaft 66 is mounted in such a way that it does not support any load other than the effort it must exert to rotate the structural member 14 relative to the structural member 12. This results in an increase of the overall structural rigidity of the rotary module 10.

As shown in FIGS. 1 and 2, the structural member 14 may be pivoted, upon activation of the actuator 48, over a range of substantially 180 degrees with respect to the structural member 12. The side plates 20 of the structural member 12 are provided with inner shoulders 74 against which the front or rear edges 76 of the side plates 24 of the structural member 14 will abut when the latter is rotated at 90 degrees relative to the structural member 12. The distance d4, as shown in FIG. 2a, is such that when the base plate 22 of the structural member 14 is perpendicular to the base plate 18 of the structural member 12 (see FIG. 2c), the underside 78 of the base plate 22 abuts against the front or rear side edges 80 of the side plates 20 depending whether the structural member 14 has been rotated clockwise or counterclockwise. The above described abutment surfaces further contributes to increasing the overall rigidity of the rotary module 10 in certain relative positions of the structural members 12 and 14 thereof.

As illustrated in FIG. 2c, a second identical rotary module 10', shown in dotted lines, can be physically attached to the first rotary module 10 by inserting conventional fasteners (not shown), such as bolts, through corresponding apertures defined in the base plate 18' of the second rotary module 10' and in the base plate 22 of the first rotary module 10. By centring the base plate 18' relative to the base plate 22 and by equalling the distances d1 and d2, shown in FIG. 2a, the front edges 17' of the base plate 18' will abut the upper surface 19 of the base plate 18 and will extend in a plane perpendicular with respect thereto when the structural members 12 and 14 of the first rotary module 10 are at right angles with respect to each other as in FIG. 2c. This thus provides additional structural rigidity to the assembly.

Figure 4:
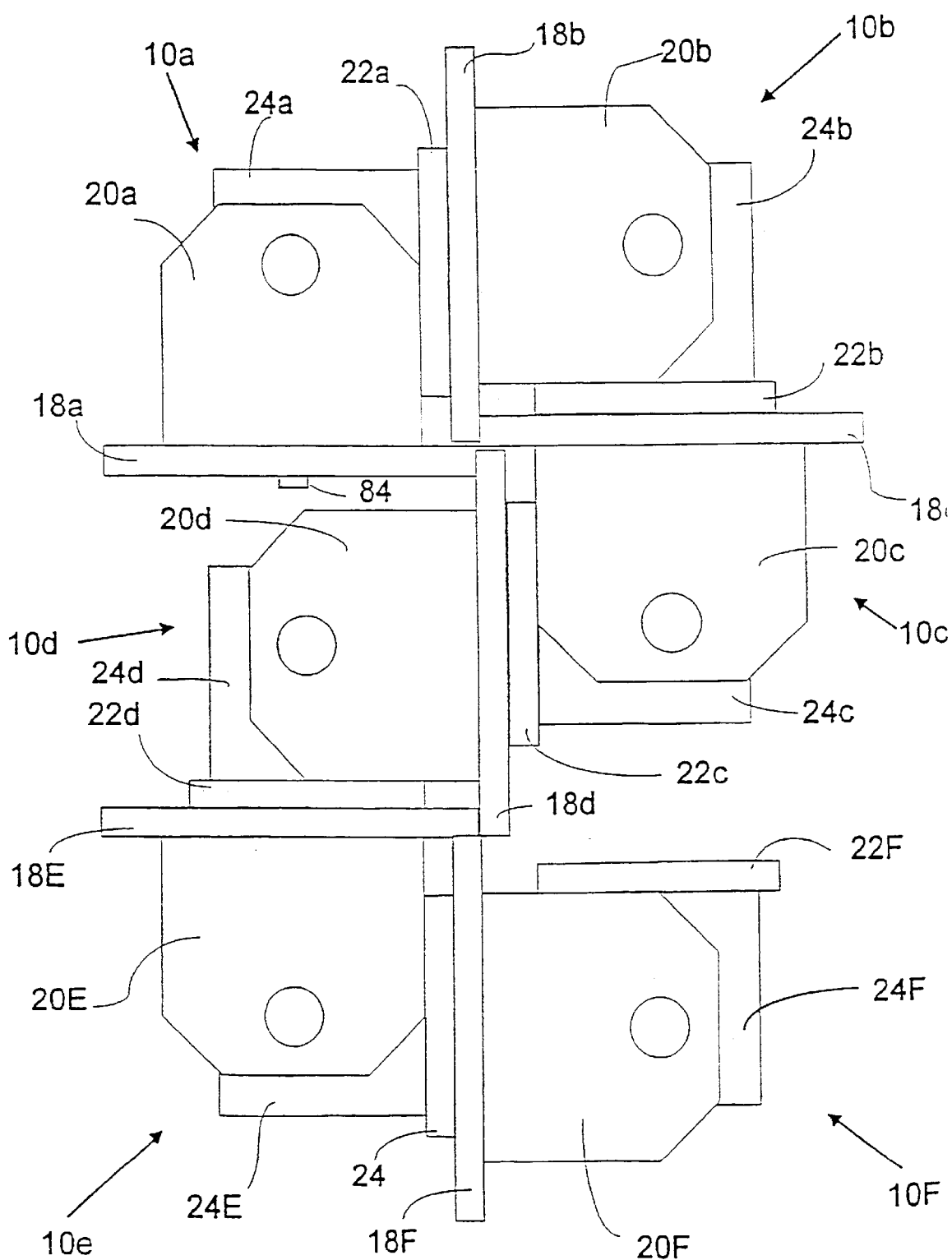
FIG. 4 is a plan view of a number of similar rotary modules assembled together in succession and showing the abutment interaction existing therebetween.

FIG. 4 shows an articulated robot structure which is formed of a series of six identical rotary modules 10a to 10f attached to one another in the manner described hereinbefore. It can be seen that when the structural members 24a to 24d of the first four rotary modules 10a to 10d are rotated in the same direction to their respective limit positions, the base plates 18a to 18d thereof are all in abutting relation, whereby these four rotary modules 10a to 10d may serve as a rigid structural base for supporting the remaining rotary modules 10e and 10f which could be used to perform a particular task. It is noted that by having the distance d1=d2=d3 and d4=d3-ϵ, as shown in FIG. 2, it is possible to minimise the volume required to form a loop with four consecutive rotary modules 10a to 10d as described above. However, it would still be possible to form such a loop by solely imparting the condition d1=d2.

Although FIG. 4 illustrates a series of six rotary modules 10a to 10f, it is understood that the number of assembled modules 10 can be varied depending on the intended application.

Each rotary module 10 further includes a position sensor for sensing the position of the motor shaft of the module 10 and a second sensor (not shown) for detecting obstacles. According to a preferred embodiment of the present invention, the position sensor is an incremental optical encoder. Two limit switches (not shown) are mounted on opposed sides of the support member 70 on each side of the gear box 50 so as to be engaged by the undersurface of the base plate 22 when the same is rotated clockwise or counterclockwise to a limit position thereof for initialisation purposes. A conventional power source (not shown), such as a battery, which may be rechargeable, may be mounted to each module 10 for supplying power to the actuator 48 thereof. A brake (not shown) can also be mounted internally of each module 10 to maintain the structural members 12 and 14 in a given desired angular position.

According to a preferred embodiment of the present invention, each module 10 further includes an electronic controller, such as a DSP (Digital Signal Processor), which is mounted, for instance, to structural member 12 and which is connected to the limit switches and the sensors of the module 10 to process their respective output information. Accordingly, velocity feedback may be obtained by differentiating the output of the position sensor in filtering the resulting signal.

As seen in FIG. 1, the base plates 18 and 22 of each module 10 are provided with a pair of connectors 82 which are connected to the electronic controller of the module by electrical conductors. The connectors 82 are such that the base plate 18 of one module 10 is connected to the base plate 22 of an adjacent module 10 by mating their connectors 82 thereby enabling control commands to be fed through the various modules 10 of a modular robot structure. Accordingly, the electronic controllers of a number of serially connected modules 10 can communicate between each other via, for instance, a RS-232 communication protocol to properly control the overall motion of the assembled modules. The connectors 82 may consist of pin connectors to enable quick connection and disconnection of the modules 10. This configuration eliminates electrical conductors running between the modules 10; indeed, the electrical conductors are used only within each module 10 to connect the connectors 82 to the electric controller of a given module 10. The cable-less connectors 82 ensure the electrical connection of the module to one another. An infrared communication interface or any other types of communication interface could be provided to allow the modules to communicate with one another.

The above described control system (not shown) is adapted to automatically detect the number of assembled modules and to generate an appropriate control algorithm in function of the number of degrees of freedom of the articulated modular robot structure. The control system is also adapted to compute the relative position of the motor shaft with respect to its module 10 and the relative positions of the assembled modules 10, and thus the absolute position of each module 10. The control system can also calculate to what position each motor shaft should be rotated to generate a desired motion of the modular robot structure. The control system is further adapted to establish a desired trajectory so as to evade an obstacle detected by the sensors of the modules 10.

A further advantage of the present invention resides in the fact that, in operation, the modular robot structure may be reconfigured by the control system. For instance, the modular robot structure of FIG. 4, which has two opposed ends, namely base plates 18a and 22f, may be reconfigured to form a closed loop. To do so, the control system commands appropriate movements of each rotary module 10a to 10f to enable the mating engagement of the connectors 82 of the base plates 18a with the connectors 82 of the base plate 22f. Once this connection is accomplished, the control system will automatically recognise the novel loop configuration of the modular robot structure and will then generate an appropriate control algorithm. As seen in FIG. 4, the underside surface of the base plate 18a is provided with pegs 84 which are adapted to be inserted in corresponding holes (not shown) defined in the top surface of the base plate 22f in order to physically solidify the connection between the base plates 18a and 22f.

Figure 5:
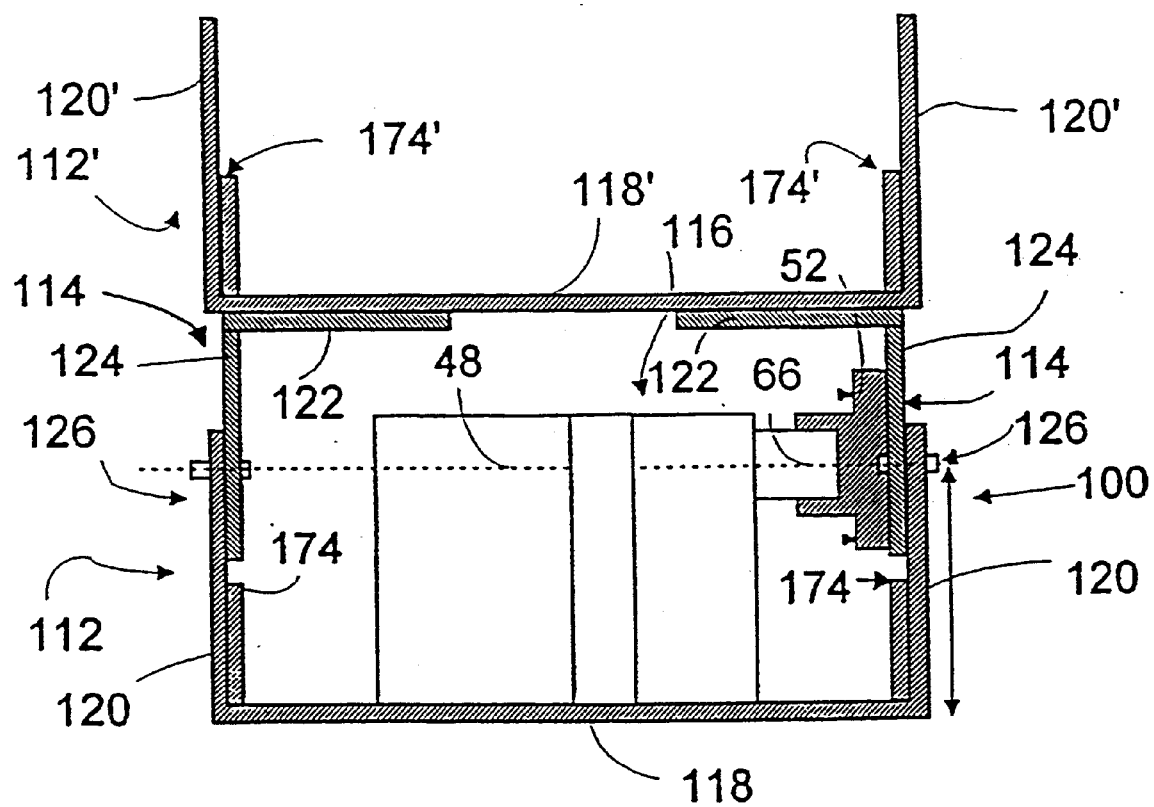
FIG. 5 is a simplified elevation view of a rotary module connected to a second similar rotary module (only part of which is shown) according to a second embodiment of the present invention.

Referring now more specifically to FIG. 5, there is shown a second type of rotary module 100 which differs from the first type of rotary module 10 in that the structural member 14 has been replaced by two substantially L-shaped members 114 which are pivotally connected to respective opposed side plates 120 of a structural member 112 for rotation about a common axis. As seen in FIG. 5, each L-shaped member 114 includes a side plate 124, which defines an aperture configured to receive a connecting pivot assembly 126 for pivotally supporting the side plate 124 adjacent an inner surface of a side plate 120 of the structural member 112. Each L-shaped member 114 further comprises a base plate 122, which extends inwardly and parallel to the base plate 118 once the L-shaped member 114 has been properly pivotally attached to a sidewall 120 of the structural member 112. The base plates 122 provide a support surface on which a base plate 118' of a structural member 112' may be fixedly secured to form with the L-shaved members 114 a H-shaped structural member. From FIG. 5, it can be readily appreciated that one rotary module can be formed with one U-shaped structural member, pivotally mounted to a H-shaped structural member, the side plates 120' of the H-shaped member forming part of the attachment means of the base plate 118' for connection the module 100 to another module. The remaining structural and control features of the rotary module 100 are similar to those of the rotary module 10 described in details hereinbefore.

Figure 6:
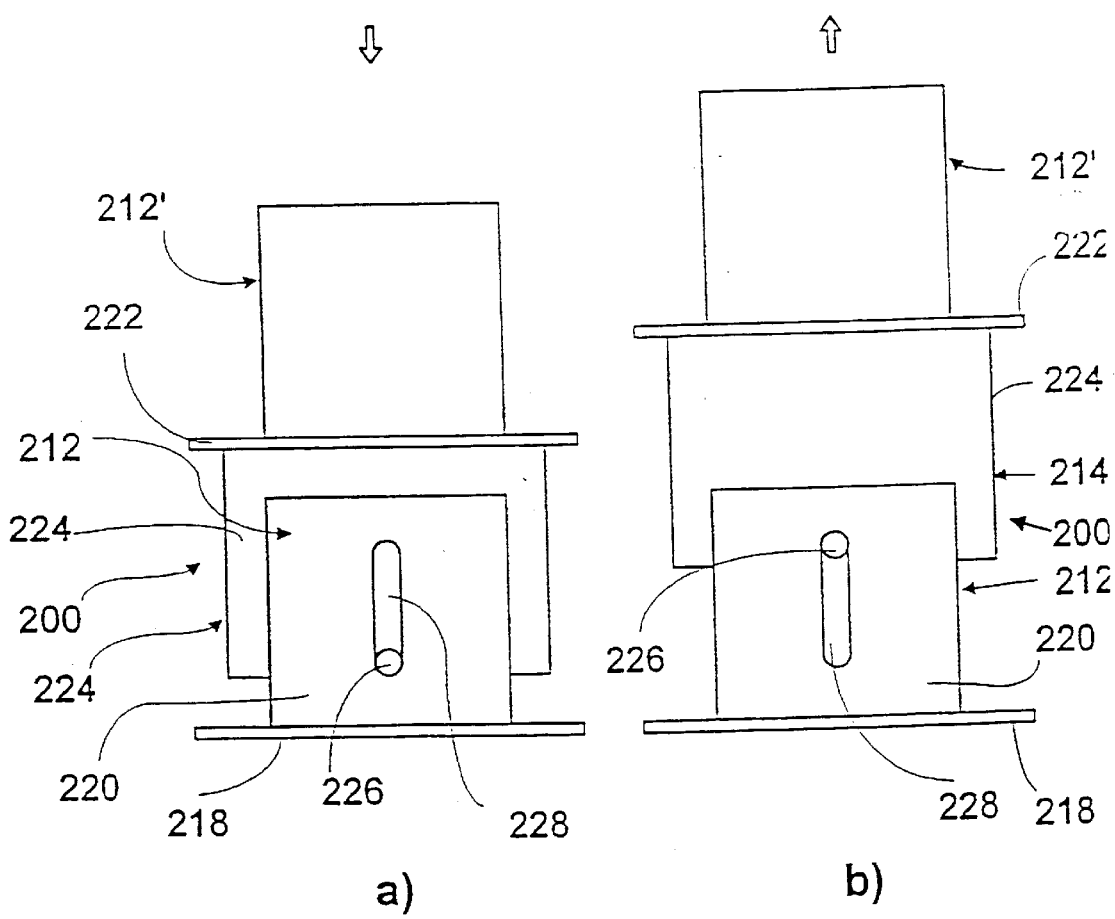
FIGS. 6a and 6b are side elevation views showing indifferent positions of a linearly displaceable module connected to an adjacent similar linearly displaceable module (only part of which is shown) according to a third embodiment of the present invention.

Referring now to FIGS. 6*a* and 6*b*, there is shown a linearly displaceable module 200 according to the present invention. The linearly displaceable module 200 comprises a pair of structural members 212 and 214, and is provided with a linear motor (not shown), which is adapted to impart a reciprocating motion to the structural member 214 relative to the structural member 212. The side plates 224 of the structural member 214 are provided with outwardly extending pins 226 which are constrained to move in guide slots 228 defined in the side plates 220 of the structural member 212 such that structural member 214 can displace, with respect to structural member 212, between retracted and extended positions, as seen in FIGS. 6*a* and 6*b* respectively. This type of modules may be used to form an expandable modular robot structure. The remaining structural and functional features of the linearly displaceable module 200 are similar to those of the rotary module 10 described hereinabove.

Figure 7:
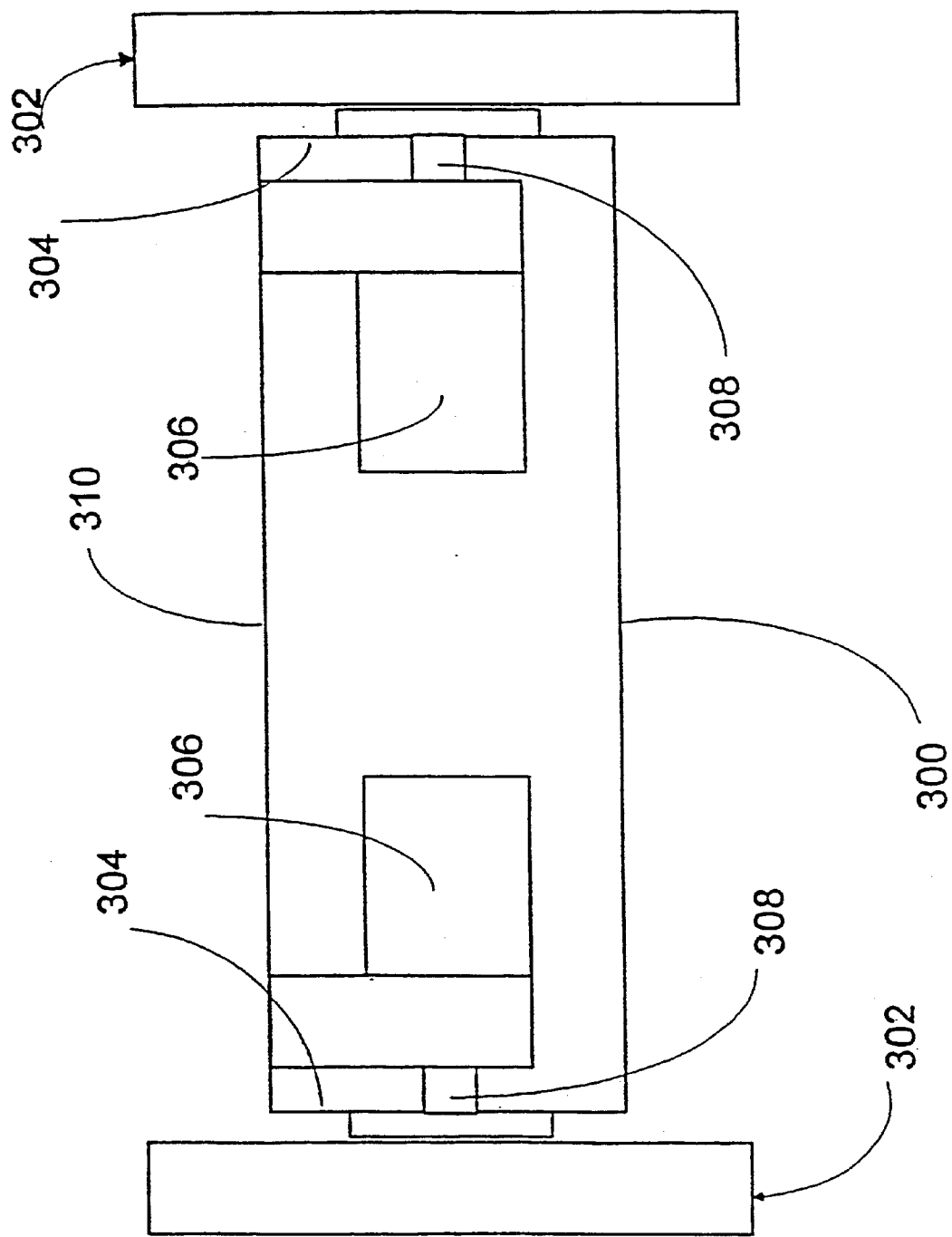
FIG. 7 is a simplified schematic top plan view of a wheeled module of an articulated robot structure according to a fourth embodiment of the present invention.
Figure 8:
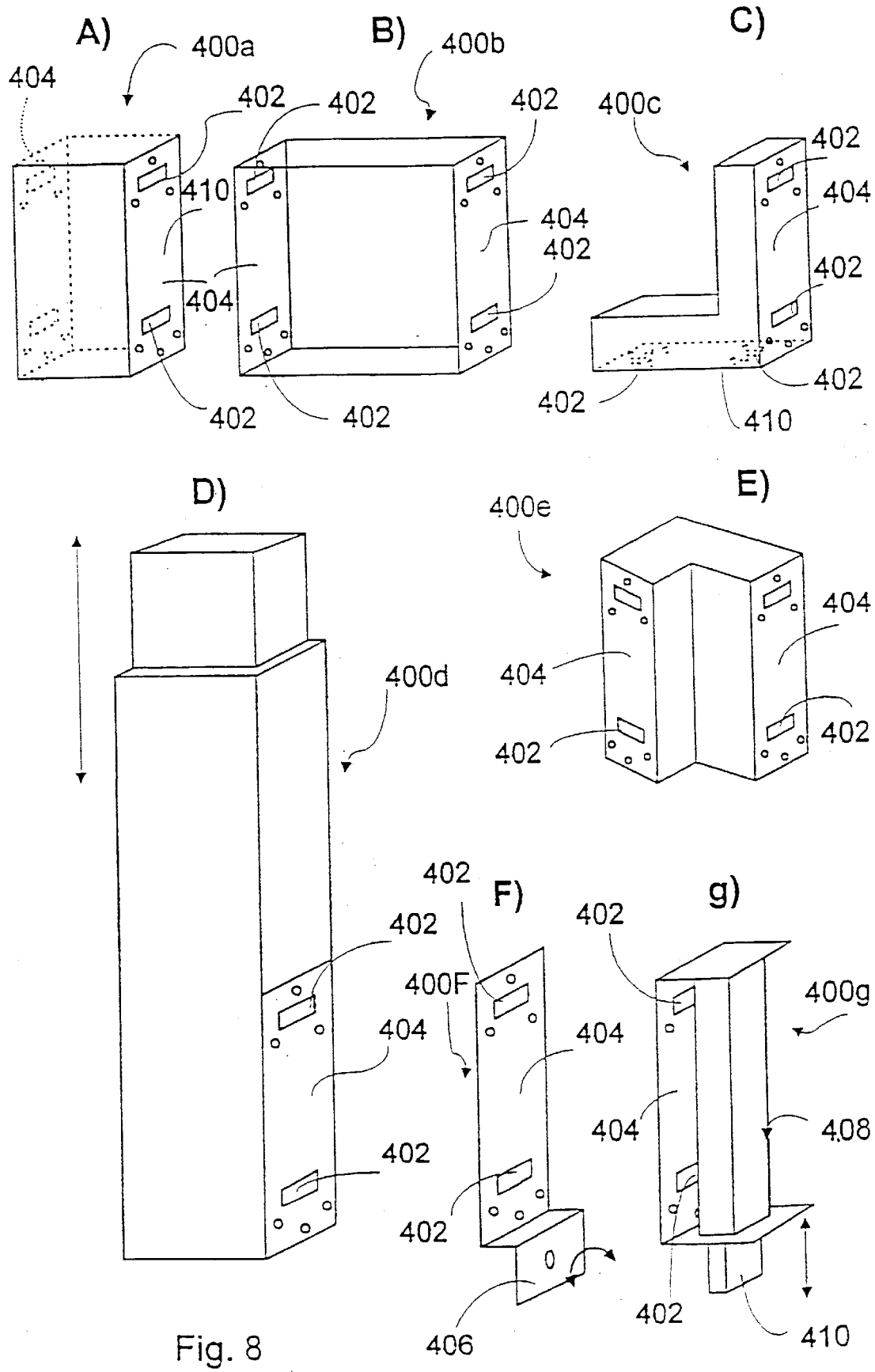
FIGS. 8a to 8g illustrate various adapters, which can be used in combination with the rotary, linearly displaceable and/or wheeled modules.

FIG. 7 illustrates an alternative of the present invention wherein a pair of lateral wheels 302 is mounted outwardly of a pair of side plates 304 of an independent wheeled module 300. A pair of motor and transmission assemblies 306 is mounted inwardly of the module 300 to drive respective lateral wheels 302. A position sensor (not shown) is coupled to each drive shaft 308 of the motor and transmission assemblies 306 and an electronic controller (not shown) is provided to process the information measured by the position sensors. The base plates 310 of the module 300 are provided with electrical connectors (not shown), such as pin connectors, for allowing the module 300 to be connected to other types of modules, such as the rotary module 10 or the linearly displaceable module 200. An example of such an assembly appears in FIGS. 11*a* and 11*b*, which are described hereinafter. Furthermore, the base plates 310 define a number of apertures (not shown) to receive fasteners for fixedly securing the module 300 to another module.

FIGS. 8*a* to 8*g* illustrates different type of adapters that could be mounted to the base or connecting plate of the above-described modules. It can be seen that all of the illustrated adapters 400*a* to 400*g* are provided with connectors 402 for allowing control commands to be fed through the adapters and through the independent modules connected therewith. The connectors 402 are mounted to connecting plates 404 which defines a number of apertures configured to receive therein fasteners for fixedly attaching the adapter to a base or connecting plate of a given module.

More specifically, the adapters 400*a* and 400*b* are each provided with a pair of parallel opposed connecting plates 404 and thus they can be connected between two modules of a modular robot structure to increase the length thereof.

The adapters 400*c* and 400*e*, which are provided with a pair of perpendicular connecting plates 404, may be used to avoid obstacles.

The adapter 400*d* may be mounted to a ceiling structure or the like to elevate or lower a modular robot structure mounted to the connecting plate 404 thereof.

The adapter 404*f* includes a connecting plate 404 adapted to be mounted at a free end of a modular robot structure, and a motor supporting plate 406 extending in a plane parallel to the connecting plate 404 while being offset thereof for supporting a motor having an axis of rotation which is perpendicular with respect thereto.

Finally, the adapter 400*g* includes a connecting plate 404 which may be mounted at a free end of a modular robot structure, and a linear motor assembly 408 having a translationally displaceable member 410 positioned so as to provide motion in a plan parallel to the connecting plate 404.

In view of the foregoing it is readily seen that a variety of robot configurations may be obtained by using a combination of different modules 10, 200 and 300 and adapters 400 in an assembled modular robot structure.

Figure 9:
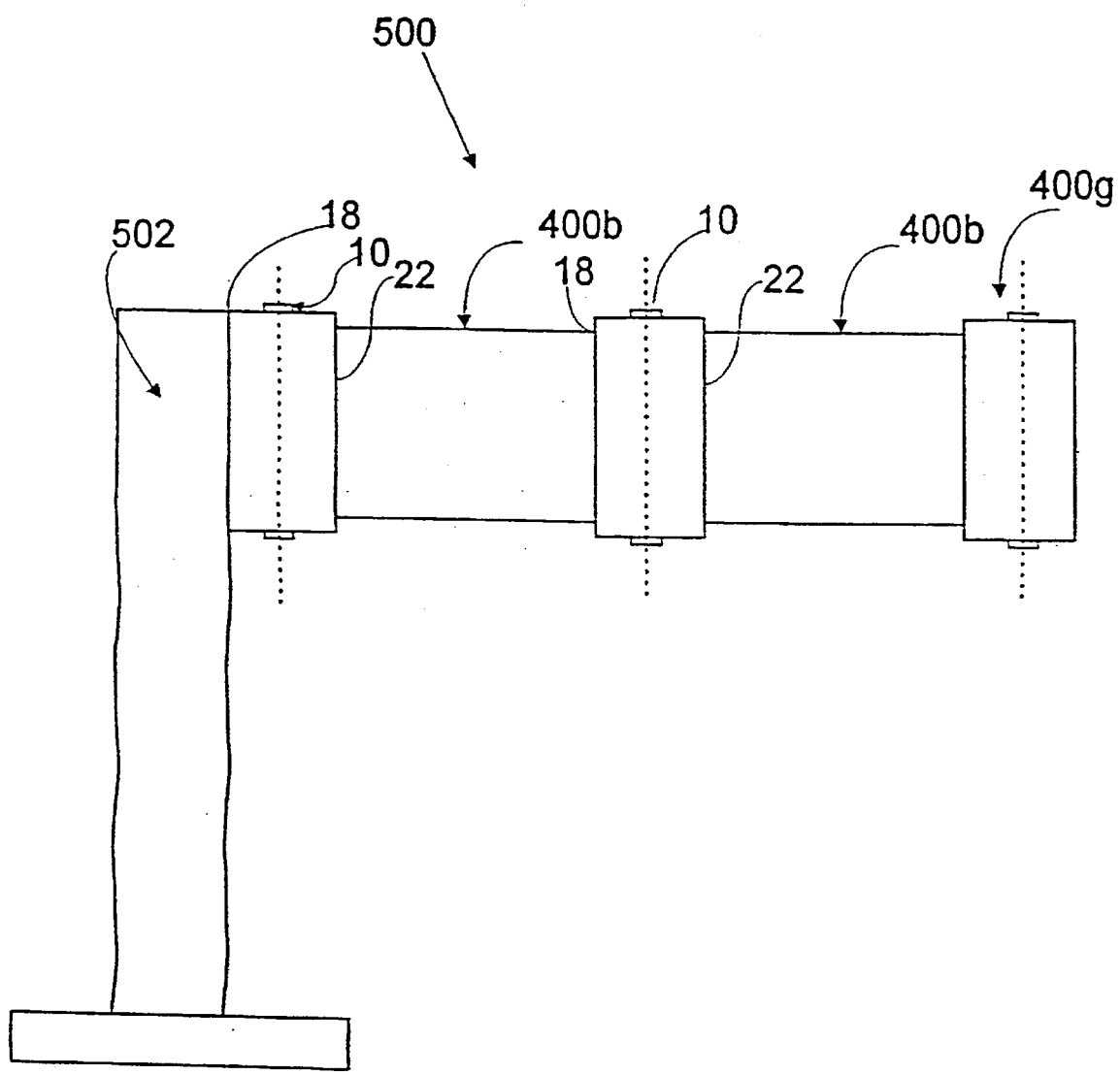
FIG. 9 is a schematic side elevation view of an articulated robot arm comprised of a number of independent modules and adapters according to the present invention.

For instance, FIG. 9 illustrates a modular robot arm 500, which is mounted to a vertical post 502. The modular robot arm 500 includes a first rotary module 10 mounted to the post 502, a first adapter 400*b* mounted proximally to the base plate 22 of the first rotary module 10, a second rotary module 10 mounted distally at an opposed end of the first adapter 400*b*, a second adapter 400*b* mounted proximally to the base plate 22 of the second rotary module 10, and an adapter 400*g* mounted at a distal end of the second adapter 400*b* for moving a particular tool (not shown) along a vertical axis. The first and second rotary modules 10 allow for the displacement of the robot arm 500 within a horizontal envelope about the post 502. The control system will automatically detect the number and type of modules and adapters, which are assembled together and will then generate an appropriate algorithm to control the motion of the modular robot arm 500.

Figure 10:
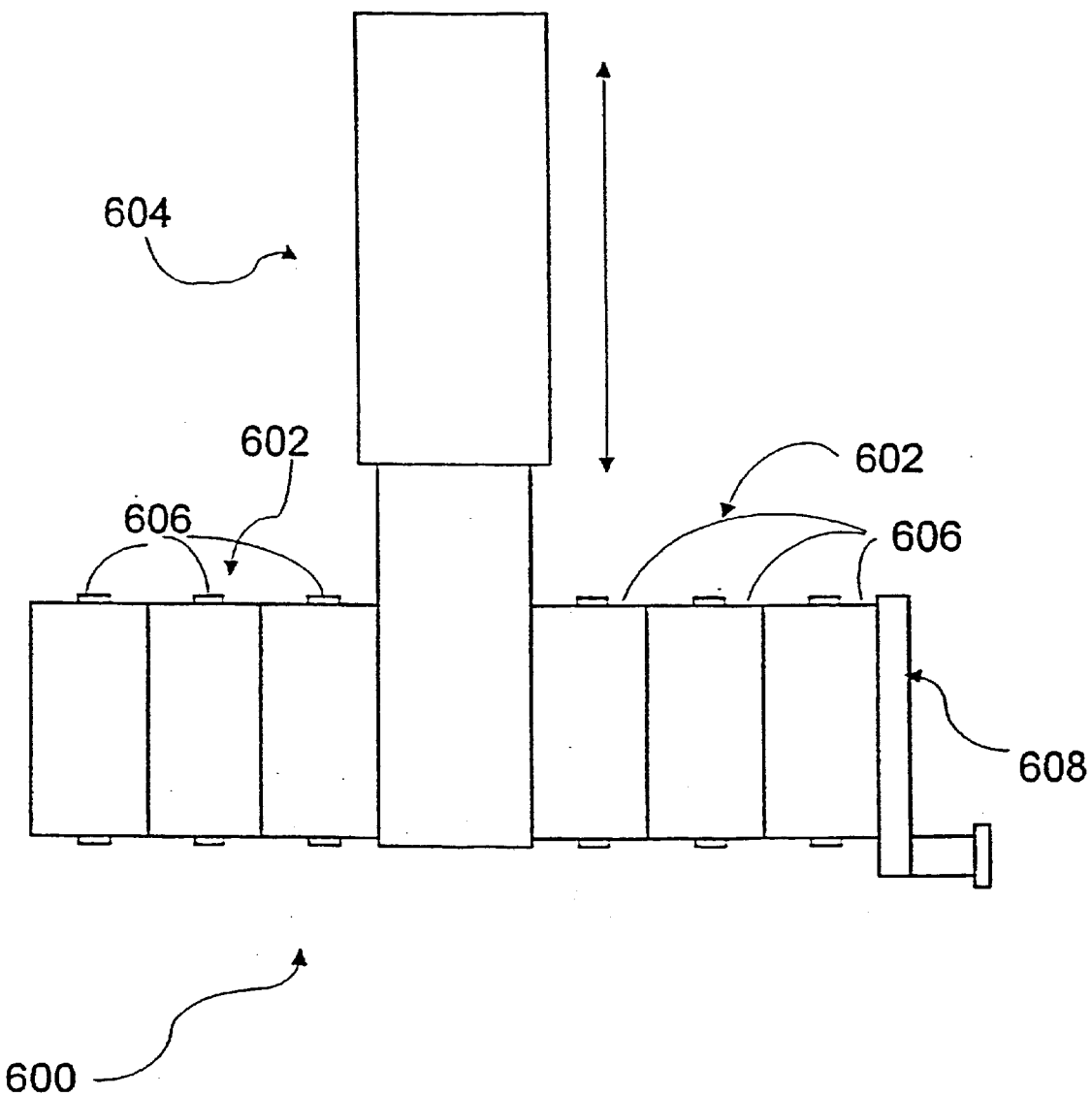
FIG. 10 is a schematic elevation view of a pair of modular robot arms.

FIG. 10 illustrates another robot structure, which could be realised with the above-described modular construction. More particularly, FIG. 10 shows a robot system 600 comprising a pair of arms 602 attached to a vertically displaceable adapter 604. Each arm 602 is composed of a series of independent rotary and/or linearly displaceable modules 606. One arm 602 may be provided at a distal end thereof with an adapter 608 similar to the adapter 400*f* described previously.

Figure 11:
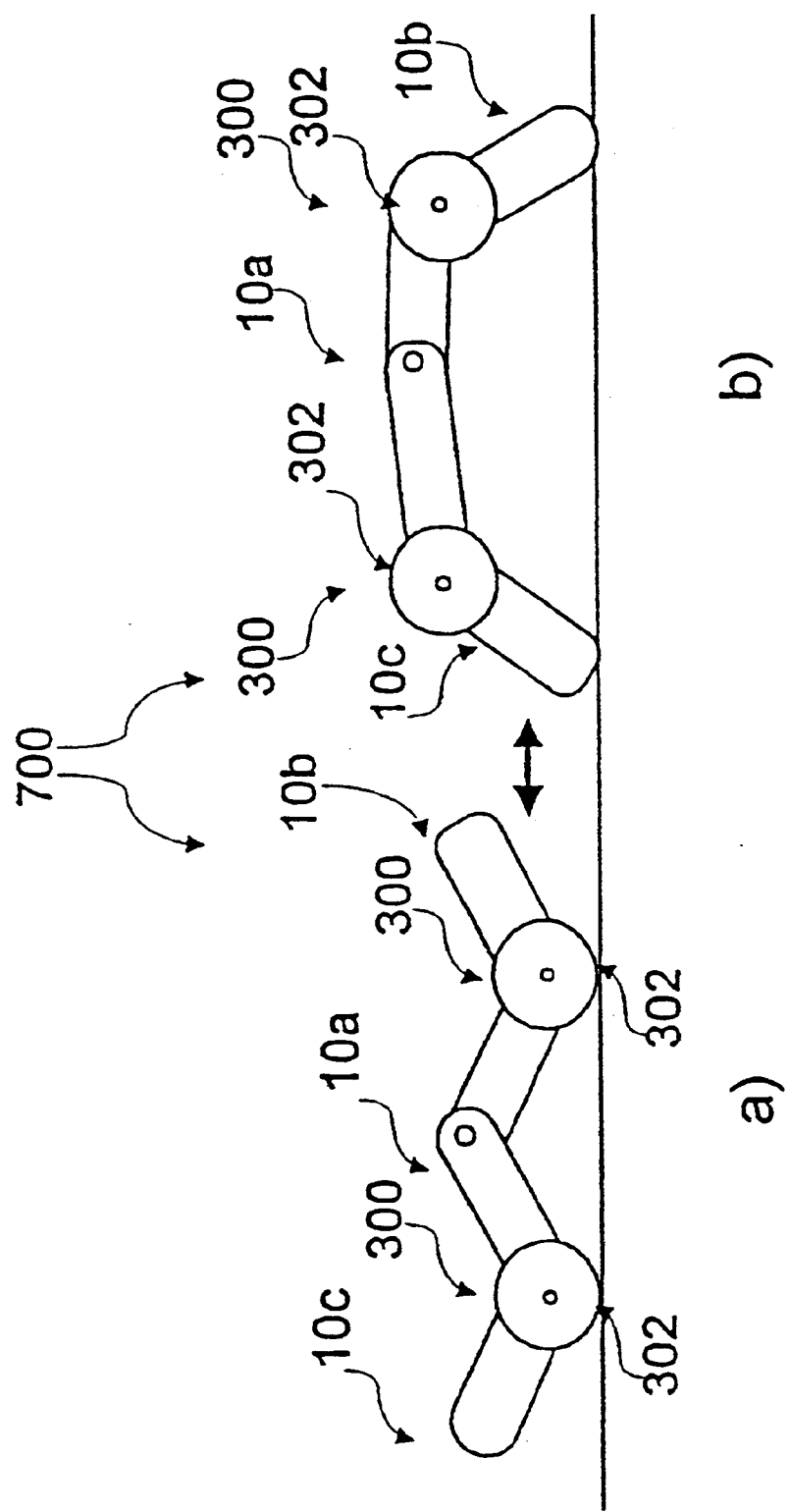
FIGS. 11a and 11b are schematic side elevation views of a transformable modular robot structure shown in different positions.

FIG. 11 shows a modular robot structure 700 composed of two wheeled modules 300 joined by a suitable number of intermediate rotary modules 10*a*, and of front and rear rotary modules 10*b* and 10*c* mounted at opposed ends of the modular robot structure 700. As illustrated in FIG. 11*a*, the wheels 302 of the supporting runner modules 300 may be used to support and move the robot structure 700 or, alternatively, the front and rear rotary modules 10*b* and 10*c* may be used to provide legged locomotion (see FIG. 11*b*).

FIG. 12*a* shows a rotary module 800, which differs from the rotary module 10 of FIG. 1 in that the structural members 812 and 814 are continuously in bearing contact so as to increase the overall load bearing capacity of the module. More particularly, the structural member 814 has a base plate 818 and a pair of side plates 820 extending at right angles from opposed sides of the base plate 818. The distal ends 821 of the side plates 820 are rounded so as to describe an arc of a circle. Likewise, the structural member 812 is provided with a base plate 822 and a pair of side plates 824 having rounded distal ends 823. The side plates 824 of the structural member 814 are received between the side plates 824 of the structural member 812 and are pivotally mounted thereto via a pivot pin 826 defining a pivot axis. The structural member 812 is provided with a pair of inner shoulders 874. The arc of circle defined by the rounded ends 821 of the side plates 820 is established so as to remain always tangent to the inner shoulders 874 while the structural member 814 is pivoted relative to the structural member 812 about the pivot pin 826, thereby providing continuous bearing contact between the structural members 812 and 814. The load bearing capacity of the module 800 is further increased by the fact that the arcs of circle described by the distal ends 823 of the side plates 824 of the structural member 812 remain tangent to the surface 819 of the base plate 818 of the structural member 814 at all time. The distances $a_1$ and $b_2$ correspond respectively to the distance between the pivot axis of the module 800 and the inner shoulder 874 and to the distance between the pivot axis and the surface 819. According to a preferred embodiment of the present invention, $a_1=b_2$. This geometric relation allows a series of interconnected modules 800 to assume a loop configuration.

Figure 12B:
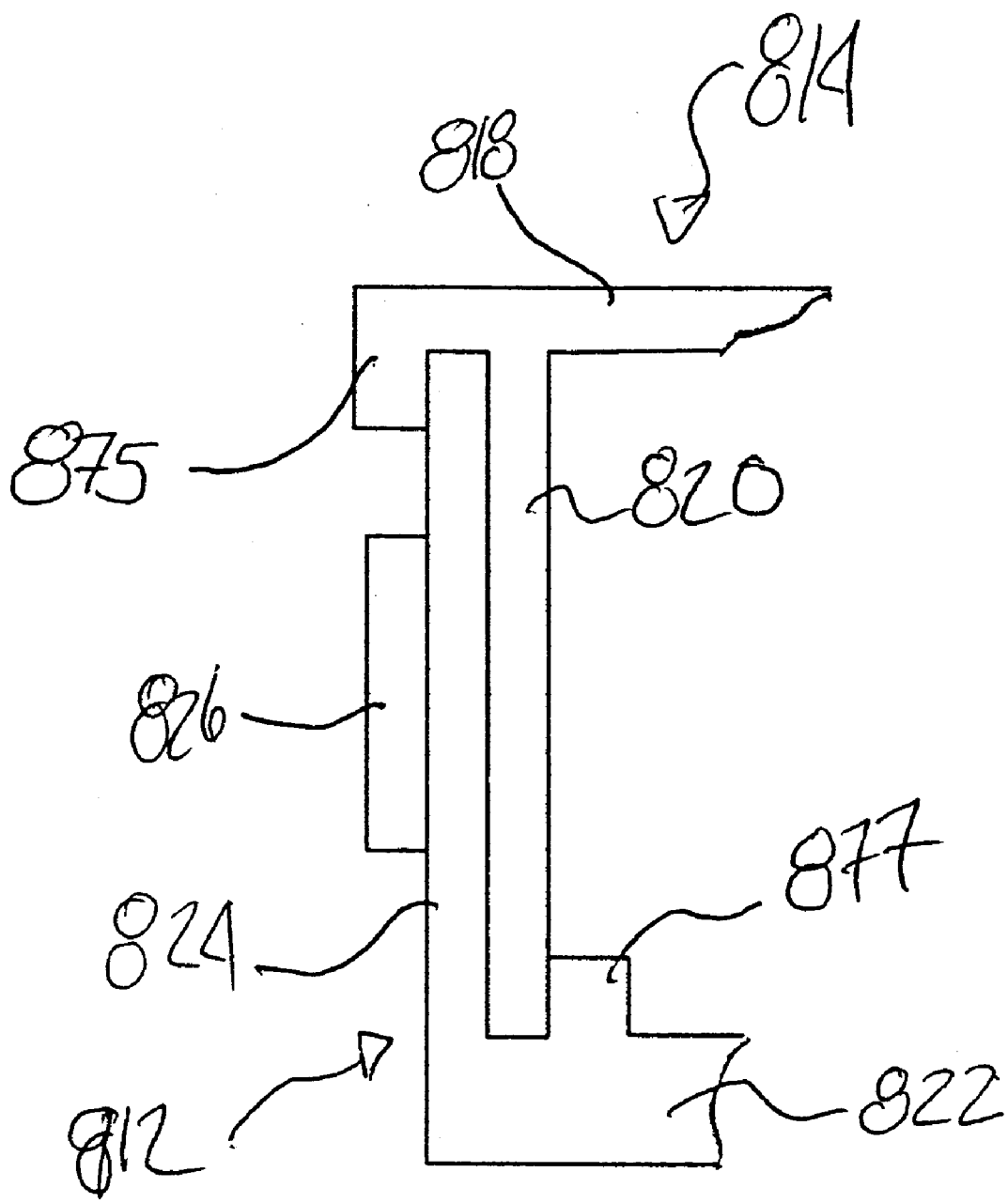
FIG. 12b is a schematic broken end elevation view of a rotary module having lateral bearing surfaces in accordance with a further embodiment of the present invention.

FIG. 12b shows an addition that can be made to the rotary module 800. More specifically, a lateral bearing surface 875 extends at right angle from each side of the base plate 818 of the second structural member 814 laterally outwardly of the side plates 820 thereof to provide lateral support to the first structural member 812, the distal end portions of the side plates 824 of the first structural member 812 being received between the side plates 820 of the second structural member 814 and the lateral bearing surfaces 875 thereof. Likewise, a pair of lateral bearing surfaces 877 extend at right angles from the base plate 822 of the first structural member 812 and laterally inwardly of the side plates 824 thereof. The distal end portions of the side plates 820 of the second structural member 814 are received between the side plates 824 of the first structural member 812 and the lateral bearing surfaces 877.

FIGS. 13 to 19 illustrate various assemblies of rotary modules, which create a walking robot structure 900. The modules are similar to the ones illustrated in FIG. 1 or 12.

The walking robot structure 900 includes a number of rotary modules 910 having respective rotating axles 926. The modules 910 are serially interconnected to form an articulated main axle having at opposed ends thereof first and second terminal modules 910a and 910b. The terminal modules 910a and 910b are each provided with a secondary axle 911 extending generally in a longitudinal direction of the so formed main axle to support and drive a riding disc 913, such as a wheel. The expression "secondary axle" is herein intended to mean any support structure for carrying a riding disc or a wheel. As can be seen from FIGS. 13 to 19, the disc or wheel axle 911 is perpendicular to the rotating axis 926 of the associated terminal module 910a/910b. Such an arrangement can also be found in the embodiment of FIG. 10 wherein the adaptor 606 supports a driven axis perpendicular to the axis of rotation of the modules.

Figure 13B:
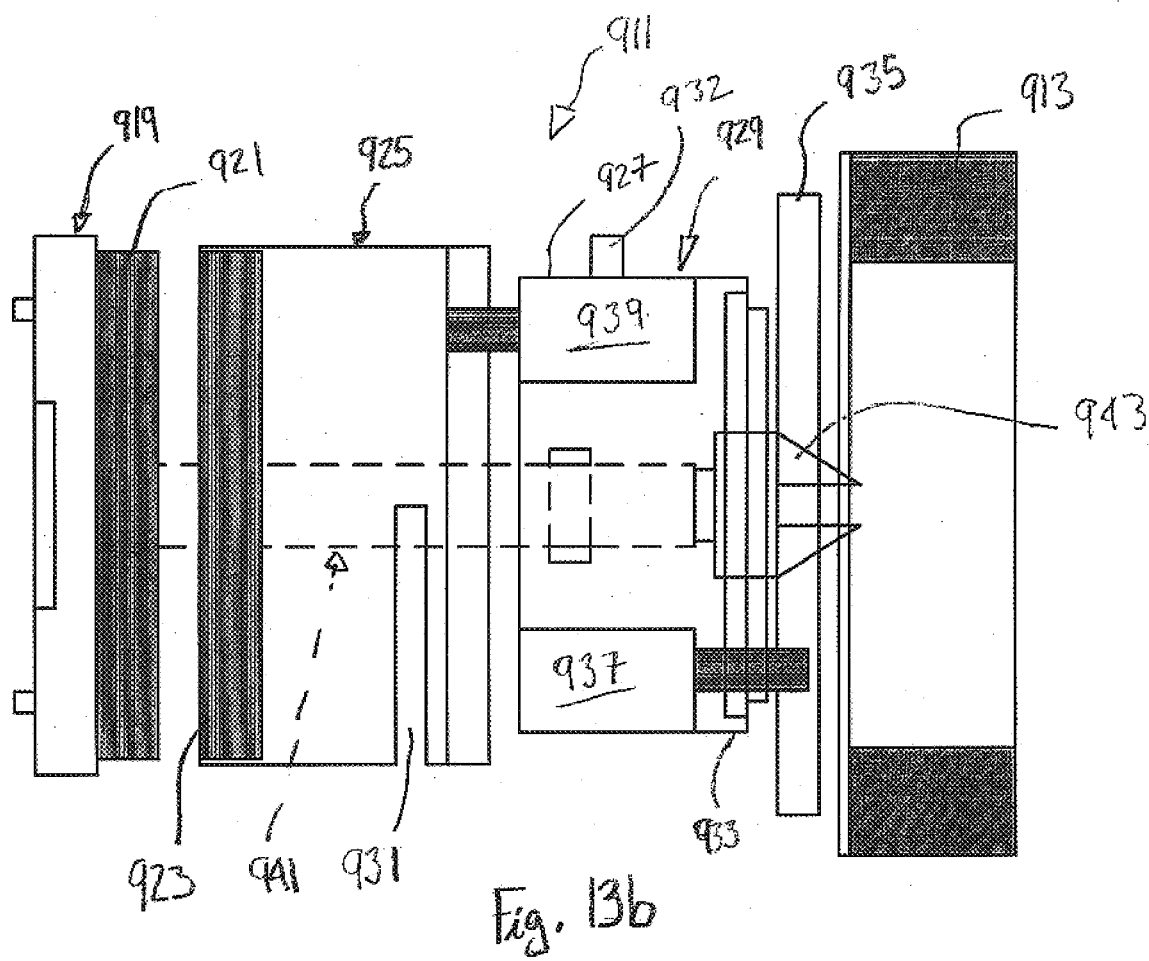

FIG. 13b illustrates the details of one of the secondary axles 911 of a walking robot 900. The secondary axle 911 includes a threaded member 919 adapted to be fixedly secured to the outer surface of the base plate 818/822 of a given terminal module 910a/910b. The threaded member 919 has an outwardly threaded cylindrical shank portion 921 for threaded engagement with an internally threaded end portion 923 of a cylindrical sleeve 925. The cylindrical sleeve 925 is mounted for rotation on an axially extending cylindrical end portion 927 of a hollow hub member 929. A circumferentially extending slot 931 is defined in the cylindrical sleeve 925. A pin 932 extends radially outwardly from the cylindrical end portion 927 of the hub member 929 and is constrained to move in the slot 931 to prevent the sleeve 925 from being axially disengaged from the hub member 929 while allowing limited rotational movement therebetween. The hub member 929 has a second end 933 opposite the cylindrical end portion 927 thereof, which is retained captive in an annular track 935 secured to the inner lateral side of the rim of the riding disc 913, thereby allowing the riding disc 913 to rotate freely on the second end 933 of the hub member 929. A first motor 937 is mounted inside the hollow hub member 929 for driving the riding disc 913 in rotation on the hub member 929. A second motor 939 is mounted inside the hollow hub member 929 and is geared to the cylindrical sleeve 925 to drive the same in rotation relative to hub member 929. When it is desired to provide wheeled locomotion the first motor 937 is powered so as to drive the riding disc 913 in rotation on the hub member 929. When it is desired to rotate the main axle, i.e. the series of rotary modules 910 between a pair of riding discs 913, the first motor 937 is turned off to lock the riding disc 913 against rotational movement on the associated hub member 929, and the second motor 939 is powered to cause the sleeve 925 to rotate with the main axle relative to the hub member 929 about the longitudinal axis of the main axle.

It is also contemplated to install an axially extendable and contractible arm 941 in one of the secondary axle 911 of the walking robot 900. The arm 941 is illustrated in a retracted position thereof in FIG. 13b. When expanded, the arm 941 projects laterally outwardly of the riding disc 913. A tool, such as a clamp 943, is provided at a distal end of the arm 941 for allowing the walking robot 900 to be used as a robot arm to perform a given task.

Figure 18:
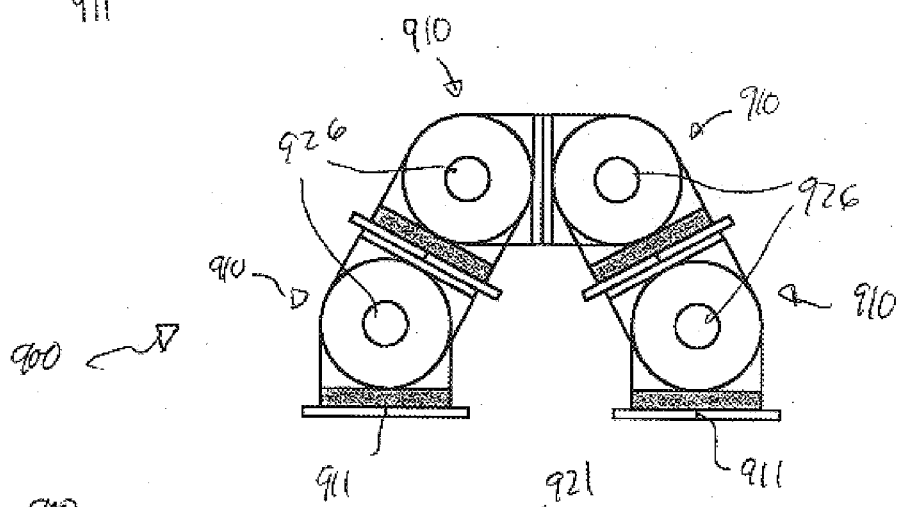
Figure 19:
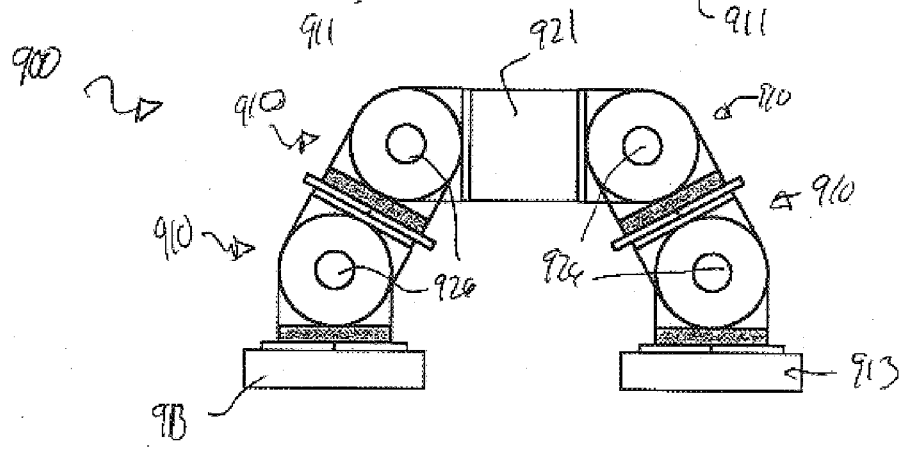
Figure 20:
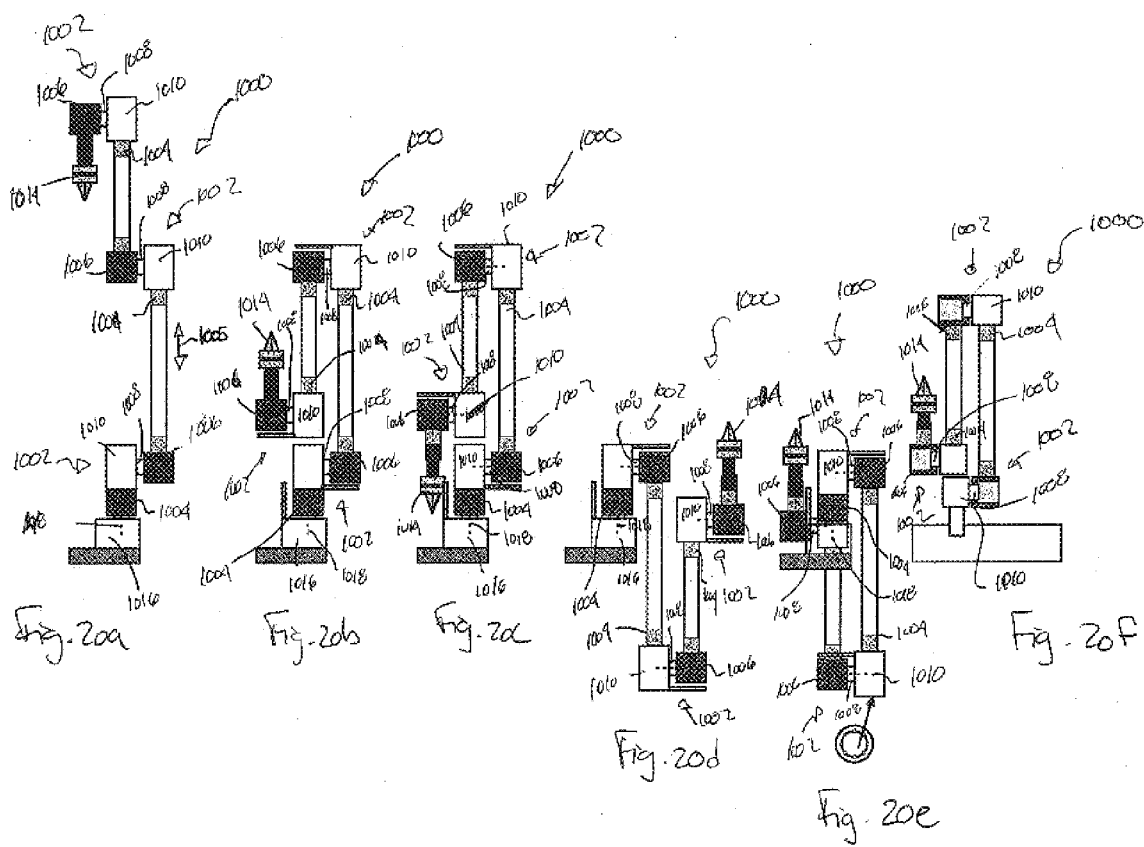
FIGS. 20a to 20f are schematic views of a modular articulated robot structure in accordance with a further embodiment of the present invention, the articulated robot structure being illustrated in various operational positions.

The above-described arrangement of modules provides a versatile walking robot structure, which can readily reconfigure itself to ride on a wide range of surfaces and over a wide variety of obstacles. For instance, as illustrated in FIGS. 13 to 15, the modules 910 can be configured to form a straight rigid line to act as an axle for the two riding discs 913 which rotate conjointly with their respective secondary axles 911. However, as illustrated in FIGS. 18 and 19, some of the structural members of the rotary modules 910 can be pivoted for allowing the walking robot 900 to walk on the external side surfaces of the discs of wheels 913. In this case, the walking robot 900 would walk by positioning the external side surface of a first disc or wheel 913 on the ground and then by driving the axle 911 of this first disc or wheel 913 so as to pivot all the series of modules in a desired direction before the external side surface of the second disc or wheel 913 is lowered on the ground surface and the axle 911 thereof is subsequently driven to effect displacement of the walking robot 900.

As can be appreciated from FIG. 13a, the rotary modules 910 can be assembled to one another so that their rotating axes 926 are parallel. However, it is understood that the rotating axes 926 of the modules 910 do not have to extend in parallel to one another. This is exemplified by FIGS. 15 and 16, wherein the rotating axes 926 of two intermediate modules 910 are perpendicular to the rotating axes 926 of the three remaining modules 910 of the series.

It is also understood that a variety of adapters, such as the one illustrated at 921 in FIGS. 13 and 19, can be inserted in the series of modules between the riding discs 913. For instance, the adapter 921 could be used to carry a battery. Alternatively, the adapter 921 could carry a load in its bottom portion to provide a self-levelling robot structure. The adapter 921 could also carry an idle riding roller or wheel (not shown) to provide additional support to the walking robot structure 900 on a riding surface (not shown). It is also contemplated to provide the adapter 921 with electromagnetic connectors for allowing a desired number of walking robots 900 to be coupled together in forwardly and backwardly spaced-apart parallel rows in order to form a vehicle having, for instance, front and rear pairs of riding discs 913. It is understood that other types of mechanical connections could be used to connect a desired number of walking robots 900 in parallel.

Figure 17:
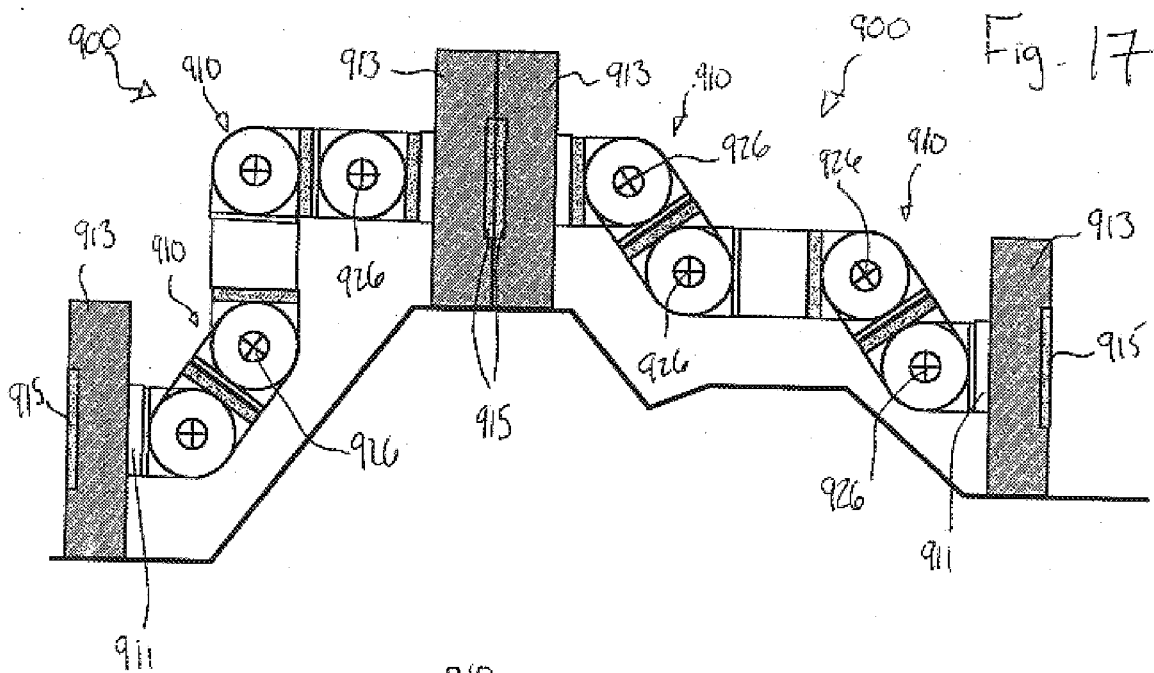

As shown in FIG. 17, electromagnetic discs 915 or other suitable types of releasable connections can be integrated in the external side surfaces of the riding discs 913 for allowing a desired number of distinct walking robots 900 to be longitudinally connected together in series to form a new unified robot.

FIGS. 20a to 20f illustrate a modular articulated robot structure 1000 comprising a number of physically and electrically connected L-shaped modules 1002. Each module 1002 includes first and second structural members 1004 and 1006 pivotally connected to each other via an axle 1008 so as to form a L-shaped module. The first and second structural members 1004 and 1006 can be linearly extensible and contractible, as indicated by arrow 1005 in FIG. 20a. Each module 1002 further includes a controller (not shown) and a rotary actuator 1010 for rotating the second structural member 1006 relative to the first structural member 1004. Intermediate parts or components, such as adapters or linear actuators, can be provided between adjacent modules 1002. In the illustrated example, a tool 1014 is provided at a distal end of the modular articulated robot structure 1000 and the latter is pivotally mounted on a turntable 1016 for pivotal movement about an axis 1018. It is contemplated to install a series of L-shaped modules 1002 on the walking robot structure 900 of FIG. 13.

Figure 21:
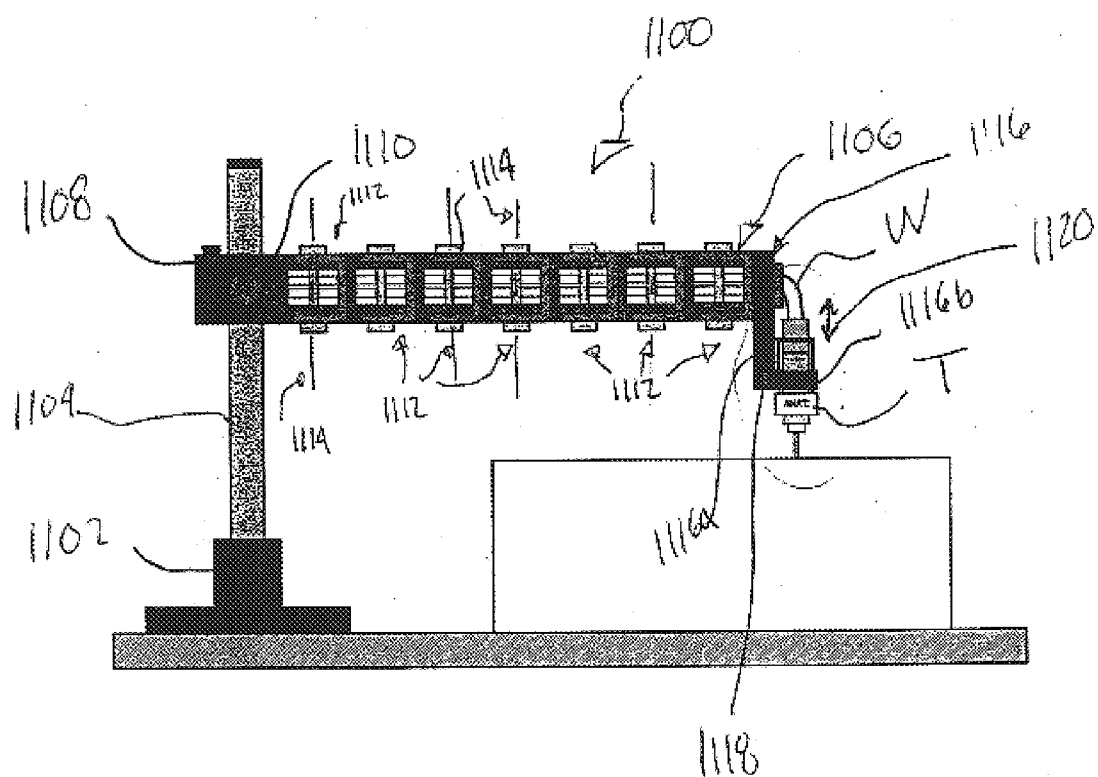
FIG. 21 is a schematic side elevation view of an article handling/supporting structure comprising a flexible arm including a number of serially interconnected rotary modules in accordance with a further embodiment of the present invention.
Figure 22:
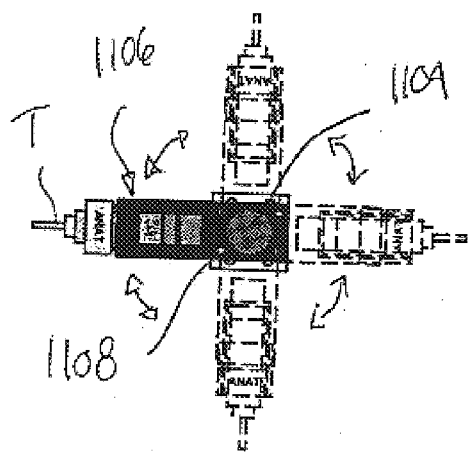
FIG. 22 is a schematic top plan view of the article handling/supporting structure of FIG. 21.

FIGS. 21 and 22 illustrate an article handling/supporting device 1100 comprising a base 1102, a cylindrical mounting column 1104 extending vertically upwardly from the base 1102, and a cantilever manually-positionable flexible arm 1106 having a proximal end connected to the mounting column 1104 and a distal end carrying an article, such as a boring tool T.

The cantilever flexible arm 1106 is provided at the proximal end thereof with a slider 1108 mounted about the column 1104 for sliding movement therealong between fixed positions. As illustrated in FIG. 22, the slider 1108 is also rotatable about the mounting column 1104. The slider 1108 is provided with a clamping structure, such as a clamping screw 1110 (FIG. 21), for releasably securing the slider 1108 in a desired position and orientation on the column 1104. The clamping structure could also be pneumatic or hydraulic.

As shown in FIG. 21, the slider 1108 is rigidly connected to a series of rotary modules 1112. The rotary modules 1112 are structurally similar to the ones illustrated in FIGS. 1 and 12 and, thus, their duplicate description will be omitted for brevity purposes. The rotary modules 1112 are assembled together so that the pivot axis 1114 of each module 1112 is vertical. This is advantageous over conventional tool handling arms, which have arm segments connected by horizontal pivot pins, in that it eliminates the need to resort to a set of springs or a pneumatic cylinder to provide for zero gravity balancing. That is to say that the vertical orientation of the pivot axes of the rotary modules 1112 provides for a self-supported flexible arm. The vertical position of the flexible arm 1106 can still be adjusted by displacing the slider 1108 on the vertical column 1104.

As shown in FIG. 21, the architecture of the rotary modules 1112 advantageously allows tool wiring W to be passed longitudinally within the arm 1106. Holes (not shown) can be defined in the opposed ends of each module 1112 for allowing the wiring W to pass from one module 1112 to the next.

An L-shaped adapter 1116 is provided at the distal end of the flexible arm 1106 to support the tool T. The L-shaped adapter 1116 comprises a main segment 1116a and a secondary segment 1116b pivotally mounted at 1118 to the lower end of the main segment 1116a. The tool T is preferably mounted to the secondary segment 1116b so as to be linearly movable with respect thereto, as depicted by arrow 1120 in FIG. 21.

Figure 23:
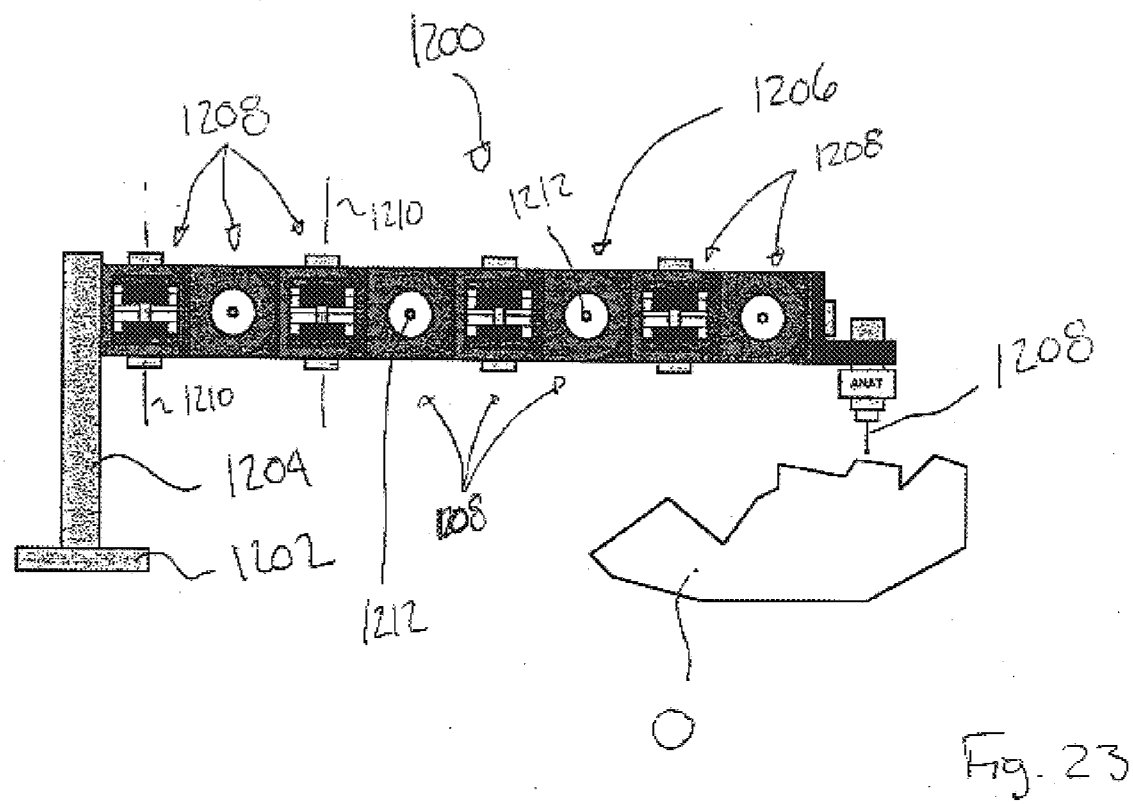
FIG. 23 is a schematic side elevation view of a three dimensional coordinate measuring device comprising a manually positionable flexible arm including a number of serially interconnected rotary modules in accordance with a further embodiment of the present invention.
Figure 24:
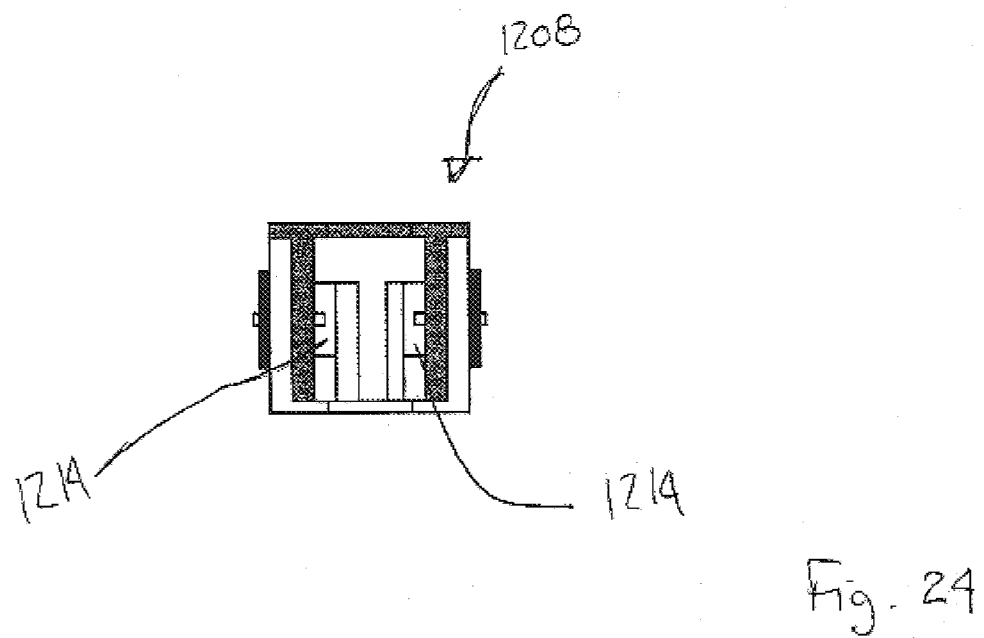
FIG. 24 is a schematic end elevation view of one of the rotary modules composing the flexible arm of the three-dimensional coordinate measuring device of FIG. 23.

FIGS. 23 and 24 illustrate a three-dimensional coordinate measuring apparatus 1200 suited for measuring a volume of a three-dimensional object O by digitising the profile thereof.

The apparatus 1200 generally comprises a base 1202, a mounting column 1204 extending vertically upwardly from the base 1202 and a flexible arm 1206 supported at a proximal end thereof by the mounting column 1204 and carrying a 3-D touch probe 1208 at a distal end thereof for engagement with the object O to be measured.

The flexible arm 1206 comprises a number of serially interconnected rotary modules 1208. The rotary modules 1208 are structurally similar to the one illustrated in FIG. 12 and a description of the structure thereof is thus not herein repeated.

As shown in FIG. 23, the rotary modules 1208 are alternately horizontally and vertically oriented. The horizontally oriented modules have respective horizontal pivot axes 1212, whereas the vertically oriented modules have respective vertical pivot axes 1210.

As illustrated in FIG. 24, a brake 1214 is mounted internally of each module 1208 to frictionally lock the structural members of a given module 1208 in a desired position. In this way a desired length of the arm 1206 can be rigidified while the remaining length thereof remains flexible. The locking friction provided by the brakes 1214 can also be used in the horizontally oriented modules to counterbalance the gravitational force so that a desired position is retained.

A position sensor or transducer (not shown) is provided within each rotary module 1208 to gather rotational position data and forward these data to a control unit (not shown) adapted to process the data to obtain the desired three-dimensional positional and orientation information on the object O upon which the tip of the probe 1208 is displaced.

The above-described flexible arm has the advantage of being of simple and sturdy construction. Furthermore, the flexibility provided by the rotary modules significantly increases the reach of the arm 1206, thereby allowing objects that are difficult to reach to be digitalized.

What is claimed is:

1. A module of an articulated robot structure, comprising first and second structural members, an axle for pivotally mounting said second structural member to said first structural member, an actuator for pivoting said second structural member relative to said first structural member, a sensor for sensing a position of said second structural member, and a control unit connected to said sensor for controlling movements of said second structural member, wherein said first and second structural members each include a base plate and a pair of spaced-apart side plates extending from said base plate, said base plates of said first and second structural members each including attachment means for releasably attaching said module to respective adjacent modules, and wherein said module is provided with a communication interface for allowing said module to communicate with adjacent modules, said communication interface being connected to said control unit for allowing control commands to be fed through a given number of assembled modules.

2. A module as defined in claim 1, wherein said axle includes a pair of idle pivot pins extending through said spaced-apart side plates of said first and second structural members.

3. A module as defined in claim 2, wherein said actuator is mounted internally of said module between said first and second structural members.

4. A module as defined in claim 3, wherein said actuator is securely mounted on the base plate of said first structural member, and wherein said second structural member pivots on said idle pivot pins, said idle pivot pins being secured to said side plates of said first structural member.

5. A module as defined in claim 1, wherein said communication interface is provided at said base plates.

6. A module as defined in claim 1, wherein said side plates of said first structural members each have a rounded distal end, said rounded distal ends being in continuous bearing contact with corresponding shoulders provided on said second structural member.

7. A module as defined in claim 6, wherein said rounded distal ends describe an arc of circle, said arc of circle being tangential to said shoulders irrespective of an angular position of said second structural member relative to said first structural member.

8. A module as defined in claim 6, wherein said side plates of said second structural member each have a rounded end, said rounded end being in continuous bearing contact with corresponding shoulders provided on said first structural member.

9. A module as defined in claim 1, wherein said first and second structural members have a configuration selected from a group consisting of a H-shaped configuration and a U-shaped configuration, and wherein said side plates of said second structural member are received between said side plates of said first structural member.

10. A walking robot structure comprising a series of rotary modules assembled in line and having a first terminal module at a first end thereof and a second terminal module at a second opposed end thereof, each rotary module having first and second structural members pivotally connected to one another for rotation about a pivot axis and being operated by an actuator, said first and second terminal modules each having an axle extending generally in parallel to a longitudinal axis of said series, said riding disc mounted on each of said axles laterally outwardly of said series, said riding disc having a circumferential surface adapted to ride on a support surface when said rotary modules are displaced in a rigid axle configuration and a lateral outer surface adapted to serve as a base surface for allowing said walking robot structure to walk on said lateral outer surfaces of said riding discs when said rotary modules are rotated relative to one another.

11. A walking robot structure as defined in claim 10, wherein said pivot axes of said rotary modules are perpendicular to said axles.

12. A walking robot structure as defined in claim 10, wherein each of said rotary module is provided with a sensor for sensing a position of said second structural member relative to said first structural member, and wherein said walking robot structure further includes a control unit operatively connected to each of said sensors for controlling said actuators, and a communication interface for allowing control commands to be fed through said series of rotary modules.

13. A walking robot structure as defined in claim 10, wherein a connector is integrated into the lateral outer surface of at least one of said riding discs for releasable physical connection with another similar walking robot, and wherein a communication interface is provided for allowing said walking robot structure to communicate with the other similar walking robot.

14. An article handling/supporting structure comprising a vertical mounting column, a cantilever flexible arm having a first end connected to said vertical column and a second opposed end adapted to carry an article, said cantilever flexible arm being vertically displaceable between fixed positions along said vertical column and including a number of serially interconnected rotary modules, each rotary module including first and second structural members, a vertical axle pivotally connecting said first and second structural members together so that adjacent modules are rotatable with respect to each other in a horizontal plane while being prevented from rotational movement in a vertical plane under gravitational forces, thereby providing for a self supported flexible arm.

15. An article handling/supporting structure as defined in claim 14, wherein said first and second structural members of each of said modules are assembled in an opposed facing relationship and have a substantially U-shaped configuration.

16. An article handling/supporting structure as defined in claim 14, wherein said rotary modules define an elongated internal passage from said first end to said second end of said cantilever flexible support arm.

17. An article handling/supporting structure as defined in claim 14, further including a slider at said first end of said support arm, said slider being linearly displaceable along said vertical mounting column and rotatable thereabout.

18. An article handling/supporting structure as defined in claim 14, wherein a rigid attachment is provided between each pair of adjacent rotary modules to releasably attach the second structural member of a first rotary module to the first structural member of a second rotary module.

* * * * *